United States Patent
Sato

(10) Patent No.: US 8,988,333 B2
(45) Date of Patent: Mar. 24, 2015

(54) LIQUID CRYSTAL DISPLAY APPARATUS, AND DRIVING DEVICE AND DRIVING METHOD OF LIQUID CRYSTAL DISPLAY ELEMENT

(71) Applicant: JVC Kenwood Corporation, Yokohama-shi, Kanagawa (JP)

(72) Inventor: Akihiro Sato, Yokosuka (JP)

(73) Assignee: JVC Kenwood Corporation, Yokohama-shi, Kanagawa (JP)

( * ) Notice: Subject to any disclaimer, the term of this patent is extended or adjusted under 35 U.S.C. 154(b) by 63 days.

(21) Appl. No.: 13/848,384

(22) Filed: Mar. 21, 2013

(65) Prior Publication Data

US 2013/0215326 A1    Aug. 22, 2013

Related U.S. Application Data

(63) Continuation of application No. PCT/JP2011/071844, filed on Sep. 26, 2011.

(30) Foreign Application Priority Data

Sep. 27, 2010 (JP) ................................. 2010-215027
Oct. 26, 2010 (JP) ................................. 2010-239377
Jul. 7, 2011 (JP) ................................. 2011-150727

(51) Int. Cl.
G09G 3/36       (2006.01)
H04N 9/31       (2006.01)
G09G 3/20       (2006.01)

(52) U.S. Cl.
CPC ........... *H04N 9/3182* (2013.01); *G09G 3/2025* (2013.01); *G09G 3/2059* (2013.01);

(Continued)

(58) Field of Classification Search
CPC . G09G 3/2024; G09G 3/3648; G09G 3/2022; G09G 3/2077; G09G 3/2927
USPC ........... 345/60, 63, 68, 87, 89, 204, 605, 690, 345/94; 349/5
See application file for complete search history.

(56) References Cited

U.S. PATENT DOCUMENTS 5,541,618 A    7/1996  Shinoda
5,724,054 A    3/1998  Shinoda (Continued)

FOREIGN PATENT DOCUMENTS

JP     4-195188 A     7/1992
JP     2000-200063 A  7/2000

(Continued)

OTHER PUBLICATIONS

Ochi, Yutaka; JP 2008-225105 A; machine translation.*

(Continued)

*Primary Examiner* — Lun-Yi Lao
*Assistant Examiner* — Peter D McLoone
(74) *Attorney, Agent, or Firm* — Nath, Goldberg & Meyer; Jerald L. Meyer

(57) ABSTRACT

A look-up table unit converts input video signal data of N bits into (M+F+D) bit data by performing inverse gamma correction and linear interpolation. An error diffusion unit converts the (M+F+D) bit data into (M+F) bit data by error diffusion processing. A frame rate control unit converts the (M+F) bit data into M bit data by frame rate control. A sub-frame data conversion unit, by using a gradation driving table and the M bit data, generates sub-frame data in which all sub-frames include a step-bit pulse respectively, and in which the number of sub-frames to be in a drive state every time the drive gradation increases by one, is increased one by one.

21 Claims, 32 Drawing Sheets

(52) U.S. Cl.
CPC ...... *G09G3/3648* (2013.01); *G09G 2320/0261* (2013.01); *G09G 3/2055* (2013.01); *G09G 3/3614* (2013.01); *G09G 3/3659* (2013.01); G09G 2320/0266 (2013.01); G09G 2320/0276 (2013.01)
USPC ............... 345/89; 345/87; 345/94; 345/204; 345/605; 345/690; 349/5

(56) References Cited

U.S. PATENT DOCUMENTS

| | | | |
|---|---|---|---|
| 6,097,357 | A | 8/2000 | Shinoda et al. |
| 6,392,620 | B1 | 5/2002 | Mizutani et al. |
| 6,630,916 | B1 | 10/2003 | Shinoda |
| 6,897,884 | B2 * | 5/2005 | Tsuge et al. ............... 345/690 |
| 7,030,846 | B2 * | 4/2006 | Lee et al. ................. 345/89 |
| 7,084,861 | B2 * | 8/2006 | Iisaka ..................... 345/204 |
| 7,088,349 | B2 * | 8/2006 | Iisaka ..................... 345/204 |
| 7,456,808 | B1 | 11/2008 | Wedding et al. |
| 7,518,622 | B2 * | 4/2009 | Ochi ....................... 345/690 |
| 7,982,755 | B2 * | 7/2011 | Ochi et al. ............... 345/690 |
| 8,463,063 | B2 * | 6/2013 | Tsukamoto ............... 382/252 |
| 8,531,490 | B2 * | 9/2013 | Harada ................... 345/690 |
| 8,552,951 | B2 * | 10/2013 | Chiang et al. ............. 345/98 |
| 8,633,880 | B2 * | 1/2014 | Kurihara ................. 345/89 |
| 2002/0093480 | A1 | 7/2002 | Mizutani et al. |
| 2002/0158857 | A1 | 10/2002 | Iisaka |
| 2003/0016199 | A1 * | 1/2003 | Lee et al. .................. 345/88 |
| 2003/0048238 | A1 * | 3/2003 | Tsuge et al. .............. 345/55 |
| 2003/0142055 | A1 | 7/2003 | Iisaka |
| 2008/0018559 | A1 * | 1/2008 | Ochi ....................... 345/59 |
| 2008/0024527 | A1 * | 1/2008 | Harada ................... 345/690 |
| 2008/0074445 | A1 * | 3/2008 | Ochi et al. ............... 345/690 |
| 2009/0058890 | A1 | 3/2009 | Kurihara |
| 2010/0007595 | A1 * | 1/2010 | Chiang et al. ............ 345/98 |
| 2010/0098337 | A1 * | 4/2010 | Tsukamoto .............. 382/190 |
| 2014/0078267 | A1 * | 3/2014 | Sato ....................... 348/54 |
| 2014/0267462 | A1 * | 9/2014 | Sato ....................... 345/690 |

FOREIGN PATENT DOCUMENTS

| | | |
|---|---|---|
| JP | 2001-523847 A | 11/2001 |
| JP | 2002-251173 A | 9/2002 |
| JP | 2002258807 A | 9/2002 |
| JP | 2005-352457 A | 12/2005 |
| JP | 2006-171651 A | 6/2006 |
| JP | 2008-225105 A | 9/2008 |

OTHER PUBLICATIONS

Takahara, Hiroshi et al.; JP 2002-258807 A; machine translation.*
European Application No. 11829008.9, Search Report dated Apr. 4, 2014, ten (10) pages.

* cited by examiner

FIG. 7

TRANSFER PERIOD  694 [μs]

| GRADATION | SF1 | SF2 | SF3 | SF4 | SF5 | SF6 | SF7 | SF8 | SF9 | SF10 | SF11 | SF12 |
|---|---|---|---|---|---|---|---|---|---|---|---|---|
| | 694 | 694 | 694 | 694 | 694 | 694 | 694 | 694 | 694 | 694 | 694 | 694 |
| 0 | 0 | 0 | 0 | 0 | 0 | 0 | 0 | 0 | 0 | 0 | 0 | 0 |
| 1 | 1 | 0 | 0 | 0 | 0 | 0 | 0 | 0 | 0 | 0 | 0 | 0 |
| 2 | 1 | 1 | 0 | 0 | 0 | 0 | 0 | 0 | 0 | 0 | 0 | 0 |
| 3 | 1 | 1 | 1 | 0 | 0 | 0 | 0 | 0 | 0 | 0 | 0 | 0 |
| 4 | 1 | 1 | 1 | 1 | 0 | 0 | 0 | 0 | 0 | 0 | 0 | 0 |
| 5 | 1 | 1 | 1 | 1 | 1 | 0 | 0 | 0 | 0 | 0 | 0 | 0 |
| 6 | 1 | 1 | 1 | 1 | 1 | 1 | 0 | 0 | 0 | 0 | 0 | 0 |
| 7 | 1 | 1 | 1 | 1 | 1 | 1 | 1 | 0 | 0 | 0 | 0 | 0 |
| 8 | 1 | 1 | 1 | 1 | 1 | 1 | 1 | 1 | 0 | 0 | 0 | 0 |
| 9 | 1 | 1 | 1 | 1 | 1 | 1 | 1 | 1 | 1 | 0 | 0 | 0 |
| 10 | 1 | 1 | 1 | 1 | 1 | 1 | 1 | 1 | 1 | 1 | 0 | 0 |
| 11 | 1 | 1 | 1 | 1 | 1 | 1 | 1 | 1 | 1 | 1 | 1 | 0 |
| 12 | 1 | 1 | 1 | 1 | 1 | 1 | 1 | 1 | 1 | 1 | 1 | 1 |

FIG. 18

TRANSFER PERIOD  694 [μs]

| GRADATION | SF1 | SF2 | SF3 | SF4 | SF5 | SF6 | SF7 | SF8 | SF9 | SF10 | SF11 | SF12 |
|---|---|---|---|---|---|---|---|---|---|---|---|---|
| | 694 | 694 | 694 | 694 | 694 | 694 | 694 | 694 | 694 | 694 | 694 | 694 |
| 0 | 0 | 0 | 0 | 0 | 0 | 0 | 0 | 0 | 0 | 0 | 0 | 0 |
| 1 | 0 | 0 | 0 | 0 | 0 | 0 | 0 | 0 | 0 | 0 | 0 | 1 |
| 2 | 0 | 0 | 0 | 0 | 0 | 0 | 0 | 0 | 0 | 0 | 1 | 1 |
| 3 | 0 | 0 | 0 | 0 | 0 | 0 | 0 | 0 | 0 | 1 | 1 | 1 |
| 4 | 0 | 0 | 0 | 0 | 0 | 0 | 0 | 0 | 1 | 1 | 1 | 1 |
| 5 | 0 | 0 | 0 | 0 | 0 | 0 | 0 | 1 | 1 | 1 | 1 | 1 |
| 6 | 0 | 0 | 0 | 0 | 0 | 0 | 1 | 1 | 1 | 1 | 1 | 1 |
| 7 | 0 | 0 | 0 | 0 | 0 | 1 | 1 | 1 | 1 | 1 | 1 | 1 |
| 8 | 0 | 0 | 0 | 0 | 1 | 1 | 1 | 1 | 1 | 1 | 1 | 1 |
| 9 | 0 | 0 | 0 | 1 | 1 | 1 | 1 | 1 | 1 | 1 | 1 | 1 |
| 10 | 0 | 0 | 1 | 1 | 1 | 1 | 1 | 1 | 1 | 1 | 1 | 1 |
| 11 | 0 | 1 | 1 | 1 | 1 | 1 | 1 | 1 | 1 | 1 | 1 | 1 |
| 12 | 1 | 1 | 1 | 1 | 1 | 1 | 1 | 1 | 1 | 1 | 1 | 1 |

FIG. 20

TRANSFER PERIOD  694 [μs]

| GRADATION | SF1 694 | SF2 694 | SF3 694 | SF4 694 | SF5 694 | SF6 694 | SF7 694 | SF8 694 | SF9 694 | SF10 694 | SF11 694 | SF12 694 |
|---|---|---|---|---|---|---|---|---|---|---|---|---|
| 0 | 0 | 0 | 0 | 0 | 0 | 0 | 0 | 0 | 0 | 0 | 0 | 0 |
| 1 | 0 | 0 | 0 | 0 | 0 | 0 | 0 | 0 | 0 | 0 | 0 | 0 |
| 2 | 0 | 0 | 0 | 0 | 0 | 0 | 0 | 0 | 0 | 0 | 0 | 0 |
| 3 | 0 | 0 | 0 | 0 | 0 | 0 | 0 | 0 | 0 | 0 | 0 | 0 |
| 4 | 0 | 0 | 0 | 0 | 0 | 0 | 0 | 0 | 0 | 0 | 0 | 0 |
| 5 | 0 | 0 | 0 | 0 | 0 | 0 | 0 | 0 | 0 | 0 | 0 | 0 |
| 6 | 0 | 0 | 0 | 0 | 0 | 0 | 0/1 | 0 | 0 | 0 | 0 | 0 |
| 7 | 0 | 0 | 0 | 0 | 0 | 1/0 | 1 | 0/1 | 0 | 0 | 0 | 0 |
| 8 | 0 | 0 | 0 | 0 | 1/0 | 1 | 1 | 1 | 0/1 | 0 | 0 | 0 |
| 9 | 0 | 1/0 | 1/0 | 1/0 | 1 | 1 | 1 | 1 | 1 | 0/1 | 0 | 0 |
| 10 | 0 | 1 | 1 | 1 | 1 | 1 | 1 | 1 | 1 | 1 | 0/1 | 0 |
| 11 | 1/0 | 1 | 1 | 1 | 1 | 1 | 1 | 1 | 1 | 1 | 1 | 0/1 |
| 12 | 1 | 1 | 1 | 1 | 1 | 1 | 1 | 1 | 1 | 1 | 1 | 1 |

FIG. 21

TRANSFER PERIOD   694 [μs]

| GRADATION | SF1 694 | SF2 694 | SF3 694 | SF4 694 | SF5 694 | SF6 694 | SF7 694 | SF8 694 | SF9 694 | SF10 694 | SF11 694 | SF12 694 |
|---|---|---|---|---|---|---|---|---|---|---|---|---|
| 0 | 0 | 0 | 0 | 0 | 0 | 0 | 0 | 0 | 0 | 0 | 0 | 0 |
| 1 | 0 | 0 | 0 | 0 | 0 | 0 | 0 | 0 | 0 | 0 | 0 | 0 |
| 2 | 0 | 1/0 | 1 | 0/1 | 0 | 0 | 0 | 0 | 0 | 0 | 0 | 0 |
| 3 | 0 | 1 | 1 | 1 | 0 | 0 | 0 | 0 | 0 | 0 | 0 | 0 |
| 4 | 1/0 | 1 | 1 | 1 | 1/0 | 0 | 0 | 0 | 0 | 0 | 0 | 0 |
| 5 | 1 | 1 | 1 | 1 | 1 | 0 | 0 | 0 | 0 | 0 | 0 | 0 |
| 6 | 1 | 1 | 1 | 1 | 1 | 1 | 0 | 0 | 0 | 0 | 0 | 0 |
| 7 | 1 | 1 | 1 | 1 | 1 | 1 | 1 | 0 | 0 | 0 | 0 | 0 |
| 8 | 1 | 1 | 1 | 1 | 1 | 1 | 1 | 1 | 0 | 0 | 0 | 0 |
| 9 | 1 | 1 | 1 | 1 | 1 | 1 | 1 | 1 | 1 | 0 | 0 | 0 |
| 10 | 1 | 1 | 1 | 1 | 1 | 1 | 1 | 1 | 1 | 1 | 0 | 0 |
| 11 | 1 | 1 | 1 | 1 | 1 | 1 | 1 | 1 | 1 | 1 | 1 | 0 |
| 12 | 1 | 1 | 1 | 1 | 1 | 1 | 1 | 1 | 1 | 1 | 1 | 1 |

| | [μs] |
|---|---|
| SF1 | 694 |
| SF2 | 694 |
| SF3 | 694 |
| SF4 | 694 |
| SF5 | 694 |
| SF6 | 694 |
| SF7 | 694 |
| SF8 | 694 |
| SF9 | 694 |
| SF10 | 694 |
| SF11 | 694 |
| SF12 | 694 |

8328

| [μs] |
|---|
| 833 |
| 763 |
| 694 |
| 624 |
| 555 |
| 555 |
| 589 |
| 625 |
| 695 |
| 729 |
| 798 |
| 868 |

| GRADATION | SF1 | SF2 | SF3 | SF4 | SF5 | SF6 | SF7 | SF8 | SF9 | SF10 | SF11 | SF12 |
|---|---|---|---|---|---|---|---|---|---|---|---|---|
| 0 | 0 | 0 | 0 | 0 | 0 | 0 | 0 | 0 | 0 | 0 | 0 | 0 |
| 1 | 1 | 0 | 0 | 0 | 0 | 0 | 0 | 0 | 0 | 0 | 0 | 0 |
| 2 | 1 | 1 | 0 | 0 | 0 | 0 | 0 | 0 | 0 | 0 | 0 | 0 |
| 3 | 1 | 1 | 1 | 0 | 0 | 0 | 0 | 0 | 0 | 0 | 0 | 0 |
| 4 | 1 | 1 | 1 | 1 | 0 | 0 | 0 | 0 | 0 | 0 | 0 | 0 |
| 5 | 1 | 1 | 1 | 1 | 1 | 0 | 0 | 0 | 0 | 0 | 0 | 0 |
| 6 | 1 | 1 | 1 | 1 | 1 | 1 | 0 | 0 | 0 | 0 | 0 | 0 |
| 7 | 1 | 1 | 1 | 1 | 1 | 1 | 1 | 0 | 0 | 0 | 0 | 0 |
| 8 | 1 | 1 | 1 | 1 | 1 | 1 | 1 | 1 | 0 | 0 | 0 | 0 |
| 9 | 1 | 1 | 1 | 1 | 1 | 1 | 1 | 1 | 1 | 0 | 0 | 0 |
| 10 | 1 | 1 | 1 | 1 | 1 | 1 | 1 | 1 | 1 | 1 | 0 | 0 |
| 11 | 1 | 1 | 1 | 1 | 1 | 1 | 1 | 1 | 1 | 1 | 1 | 0 |
| 12 | 1 | 1 | 1 | 1 | 1 | 1 | 1 | 1 | 1 | 1 | 1 | 1 |

LIQUID CRYSTAL DISPLAY APPARATUS, AND DRIVING DEVICE AND DRIVING METHOD OF LIQUID CRYSTAL DISPLAY ELEMENT

CROSS REFERENCE TO RELATED APPLICATION

This is a continuation application based on PCT application No. PCT/JP2011/071844 filed on Sep. 26, 2011, which claims the benefit of priority from Japanese Patent Application No. 2010-215027 filed on Sep. 27, 2010, No. 2010-239377 filed on Oct. 26, 2010, and No. 2011-150727 filed on Jul. 7, 2011, the entire contents of which are incorporated by reference herein.

BACKGROUND

The present invention relates to a liquid crystal display apparatus, a driving device of a liquid crystal display element, and a driving method of the same, and in particular relates to a liquid crystal display apparatus which, through the use of a digitized video signal as an input signal, divides one frame into a plurality of sub-frames and displays images, a driving device of a liquid crystal display element, and a driving method of the same.

The driving method of a liquid crystal display element used for a liquid crystal display apparatus includes an analog method, in which values of voltage applied to a pixel are continuous analog values, and a digital method including the steps of: binarizing the magnitude of a voltage applied to a pixel; and varying the time width of the applied voltage in response to the luminance (gradation) of an image and thereby controlling the effective value of voltage applied to the pixel of a liquid crystal. The digital method is characterized in that it is unlikely to be affected by an external factor such as noise, because only the information of 0 or 1 is applied to a pixel.

In the digital method, a sub-field method is usually used in order to obtain an intermediate gradation. The sub-field method includes the steps of: in one field period of a video signal, preparing a predetermined number of sub-fields in each of which a relative ratio of a drive (light emission) period is varied; appropriately selecting and displaying a sub-field in response to the gradation of a video signal to be displayed; and displaying an intermediate gradation by utilizing a viewer's visual integration effect.

It is known that although, in the sub-field method, a good display image is obtained at the time of displaying a still image, a pseudo contour is generated at the time of displaying a moving image. As a method for solving the pseudo contour, a method for arranging sub-fields is under study that does not cause a change of the center of gravity of light emission as much as possible even if image data varies.

Patent Literature 1 (Japanese Patent Application Laid-Open Publication No. 2006-171651) describes a sub-field method including the steps of: dividing a portion corresponding to higher bits into a plurality of equally-weighted sub-fields; dividing a portion corresponding to lower bits into a plurality of binary-weighted sub-fields; arranging the plurality of binary-weighted sub-fields in the center of one field; dividing the plurality of sub-fields of the portion corresponding to the higher bits into two, respectively; and arranging the resulting sub-fields on both sides of the plurality of binary-weighted sub-fields.

Meanwhile, along with an increase in resolution, an increase in contrast and the like in the recent image display apparatuses, the pseudo contour at the time of displaying a moving image needs to be further reduced.

SUMMARY

Therefore, the present invention provides a liquid crystal display apparatus that generates very few moving image pseudo-contours responsible for image degradation and has high quality even at the time of displaying a moving image.

In order to solve the problems in the conventional art described above, according to an aspect of an embodiment of the present invention, there is provided a driving device of a liquid crystal display element, including: a look-up table unit configured to convert input video signal data of N bits to (M+F+D) bit data, when N, M, F, and D are integers, by performing inverse gamma correction and linear interpolation, where (M+F+D) is larger than N; an error diffusion unit configured to convert the (M+F+D) bit data processed by the look-up table unit, into (M+F) bit data by error diffusion processing; a frame rate control unit configured to convert the (M+F) bit data processed by the error diffusion unit, into M bit data by frame rate control; and a sub-frame data conversion unit configured to generate sub-frame data by using the M bit data processed by the frame rate control unit, configuring all sub-frames by a step-bit pulse respectively, and using a drive gradation table where when a drive gradation is 1, an arbitrary sub-frame reaches a drive state, and the number of sub-frames to be in a drive state every time the drive gradation increases by one, is increased one by one toward forward or backward of a sub-frame already in a drive state.

Furthermore, there is provided a driving device of a liquid crystal display element, including: a signal conversion unit configured to convert input video signal data of N bits into (M+F+D) bit data when N, M, F, and D are integers, by performing linear interpolation, where (M+F+D) is larger than N; an error diffusion unit configured to convert the (M+F+D) bit data processed by the signal conversion unit, into (M+F) bit data by error diffusion processing; a frame rate control unit configured to convert the (M+F) bit data processed by the error diffusion unit, into M bit data by frame rate control; and a sub-frame data conversion unit configured to generate sub-frame data by using the M bit data processed by the error diffusion unit and using a drive gradation table where when a drive gradation is 1, an arbitrary sub-frame reaches a drive state, the number of sub-frames to be in a drive state every time the drive gradation increases by one, is increased one by one toward forward or backward of a sub-frame already in a drive state, and where a driving period is varied for each sub-frame so that an optical output of a liquid crystal with respect to the input video signal data has an inverse gamma property.

Moreover, there is provided a liquid crystal display apparatus, including: any of the above-described driving devices of liquid crystal display elements; a liquid crystal display element configured to be driven by the driving device; an illumination optical system configured to cause illumination light to be incident upon the liquid crystal display element; and a projection lens configured to project modulated light emitted from the liquid crystal display element.

In addition, there is provided a driving method of a liquid crystal element, including: a first step of converting input video signal data of N bits into (M+F+D) bit data, when N, M, F, and D are integers, by performing inverse gamma correction and linear interpolation, where (M+F+D) is larger than N; a second step of converting the (M+F+D) bit data processed in the first step, into (M+F) bit data by error diffusion processing; a third step of converting the (M+F) bit data processed in the second step, into M bit data by frame rate control; and a fourth step of generating sub-frame data by using the M bit data processed in the third step, configuring all sub-frames by a step-bit pulse respectively, and using a drive gradation table, where when a drive gradation is 1, an arbitrary sub-frame reaches a drive state, and the number of sub-frames to be in a drive state every time the drive gradation increases by one, is increased one by one toward forward or backward of a sub-frame already in a drive state.

Furthermore, there is provided a driving method of a liquid crystal element, including: a first step of converting input video signal data of N bits into (M+F+D) bit data when N, M, F, and D are integers, by performing linear interpolation, where (M+F+D) is larger than N; a second step of converting the (M+F+D) bit data processed in the first step, into (M+F) bit data by error diffusion processing; a third step of converting the (M+F) bit data processed in the second step, into M bit data by frame rate control; and a fourth step of generating sub-frame data by using the M bit data processed in the third step and using a drive gradation table where when a drive gradation is 1, an arbitrary sub-frame reaches a drive state, the number of sub-frames to be in a drive state every time the drive gradation increases by one, is increased one by one toward forward or backward of a sub-frame already in a drive state, and where a driving period is varied for each sub-frame so that an optical output of a liquid crystal with respect to the input video signal data has an inverse gamma property.

Moreover, there is provided a liquid crystal display apparatus, including: any of the above-described driving devices of liquid crystal display elements; a liquid crystal display element configured to be driven by the driving device; an illumination optical system configured to cause illumination light to be incident upon the liquid crystal display element; and a projection lens configured to project modulated light emitted from the liquid crystal display element, wherein the liquid crystal display element individually includes a first sampling and holding unit and a second sampling and holding unit, wherein the first sampling and holding unit, during a data transfer period with respect to a predetermined sub-frame, receives and holds data with respect to the predetermined sub-frame, and transfers the data with respect to the predetermined sub-frame to the second sampling and holding unit after an end of the data transfer period with respect to the predetermined sub-frame, and wherein the liquid crystal display element, during a data transfer period with respect to the next sub-frame of the predetermined sub-frame, performs a driving for the predetermined sub-frame based on data which the second sampling and holding unit holds.

According to the present invention, a liquid crystal display apparatus that generates very few moving image pseudo-contours responsible for image degradation and has high quality even at the time of displaying a moving image can be provided.

BRIEF DESCRIPTION OF THE DRAWINGS

FIG. 7 is a view showing a drive gradation table in the first embodiment.

FIG. 18 is a view showing a drive gradation table in a second embodiment.

FIG. 20 is a view showing a drive gradation table in a third embodiment.

FIG. 21 shows an example of another view showing the drive gradation table in the third embodiment.

FIG. 32 is a view showing a drive gradation table in the sixth embodiment.

DETAILED DESCRIPTION

Hereinafter, an image display apparatus and a driving method of the same according to the present invention will be described with reference to the accompanying drawings. The present invention can be applied to a panel type image display apparatus such as a LCD, a PDP, or a DLP, including a display panel having therein a plurality of pixels arranged in a matrix, and hereinafter, a projection type display apparatus including an active matrix type and reflection type liquid crystal display element as a display panel, will be described as an example. First, the schematic configurations of a projection type display apparatus and a reflection type liquid crystal display element are described.

Figure 1:
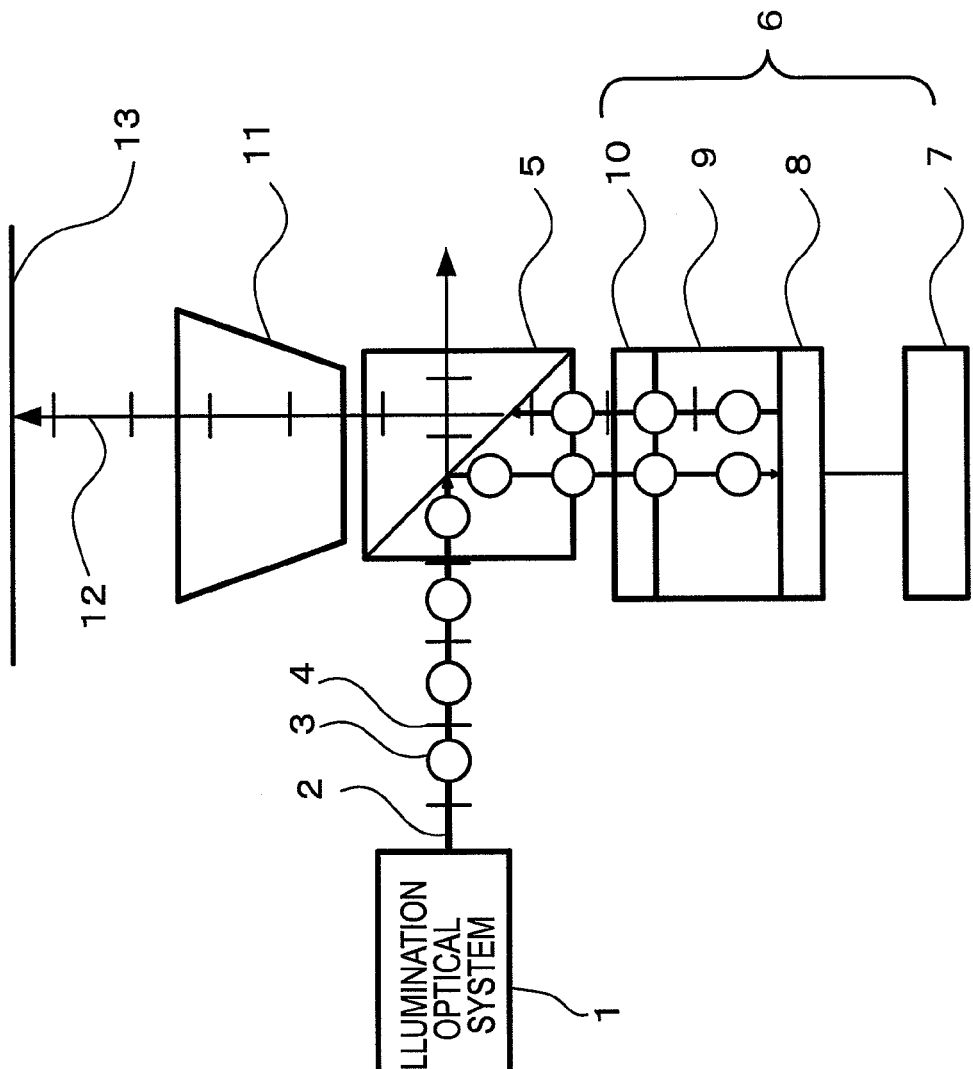
FIG. 1 is a schematic configuration diagram showing a liquid crystal display apparatus using a reflection type liquid crystal display element.

FIG. 1 is a schematic configuration diagram showing a liquid crystal display apparatus using a reflection type liquid crystal display element. The liquid crystal display apparatus includes a reflection type liquid crystal display element 6, a polarization beam splitter 5 (hereinafter, referred to as a PBS), and a projection lens 11. The reflection type liquid crystal display element 6 has a structure in which a liquid crystal 9 is sealed between a counter electrode (referred to as also a transparent electrode) 10 and a pixel electrode 8.

Light 2 including S-polarized light 3 and P-polarized light 4 emitted from an illumination optical system 1 is incident upon the PBS 5, and is polarized and split there. The S-polarized light 3 is reflected by a polarization splitting plane of the PBS 5, and travels to the reflection type liquid crystal display element 6 side. The P-polarized light transmits through the polarization splitting plane of the PBS. The liquid crystal 9 of the reflection type liquid crystal display element 6 modulates the incident S-polarized light in response to a voltage applied between the pixel electrode 8 and the counter electrode 10 by a pixel circuit 7. The S-polarized light incident upon the counter electrode 10 is modulated in the process from being reflected by the pixel electrode 8 to being emitted from the counter electrode 10, and is emitted from the counter electrode 10 as light including the P-polarized light and the S-polarized light. For the light emitted from the counter electrode 10, only P-polarized component of the modulated light transmits through the PBS 5, and the S-polarized component is reflected by the PBS 5. The P-polarized light having transmitted through the PBS 5 is emitted by the projection lens 11, and emitted light 12 is projected onto a screen 13, where an image is displayed. Note that the intensity of output light to be described later refers to the luminance of the output light measured on the screen 13.

Figure 2:
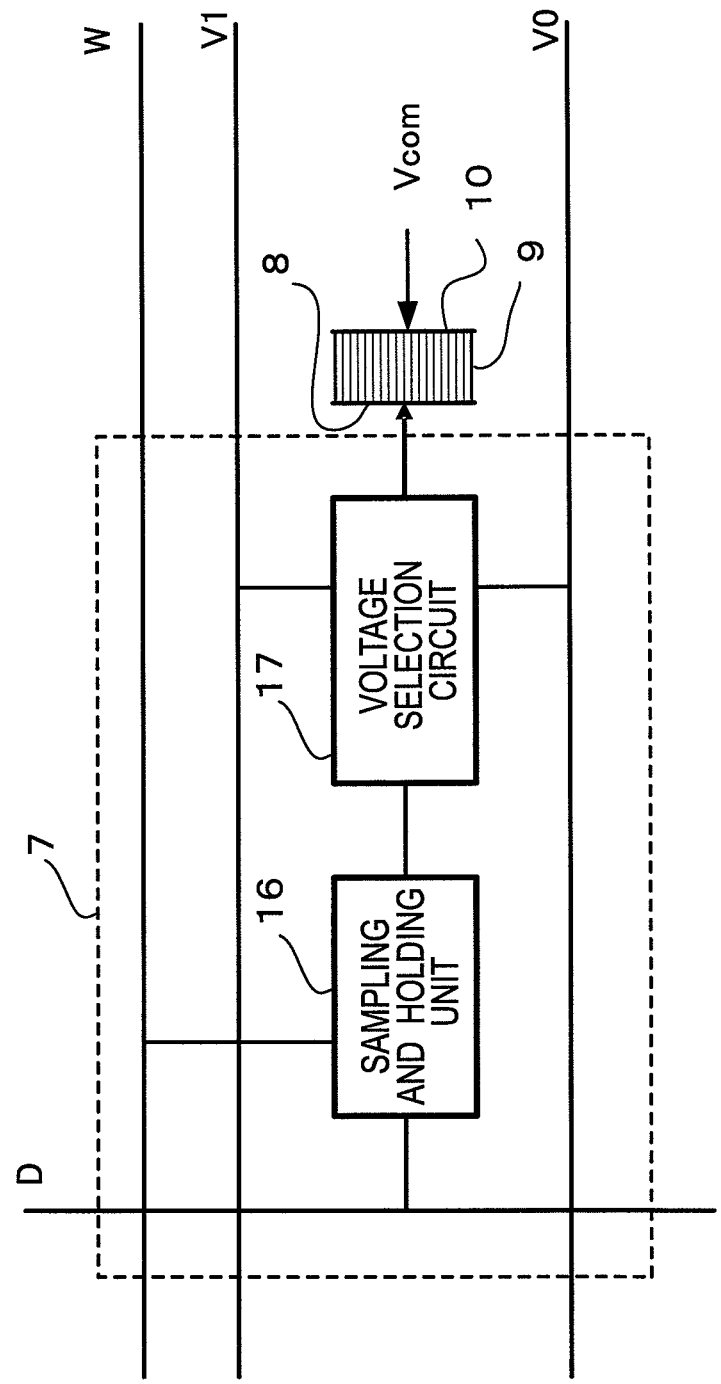
FIG. 2 is a view showing the configuration of a driving circuit of each pixel in a digital-driven reflection type liquid crystal display element.

FIG. 2 is a view showing the configuration of a driving circuit of each pixel in the digital-driven reflection type liquid crystal display element 6. An individual pixel of the reflection type liquid crystal display element 6 has a structure in which the liquid crystal 9 is interposed between the pixel electrode 8 and the counter electrode 10. The pixel circuit 7 indicated by a dotted line includes a sampling and holding unit 16 and a voltage selection circuit 17. The sampling and holding unit 16 includes a flip-flop of an SRAM structure. The sampling and holding unit 16 is connected to a column data line D and a row selection line W. The output of the sampling and holding unit 16 is connected to the voltage selection circuit 17. The voltage selection circuit 17 is connected to a blanking voltage line V0 and a driving voltage line V1. The voltage selection circuit 17 is connected to the pixel electrode 8 to provide a predetermined voltage to the pixel electrode 8. The value of the voltage of the counter electrode 10 is referred to as a common voltage Vcom.

Figure 3:
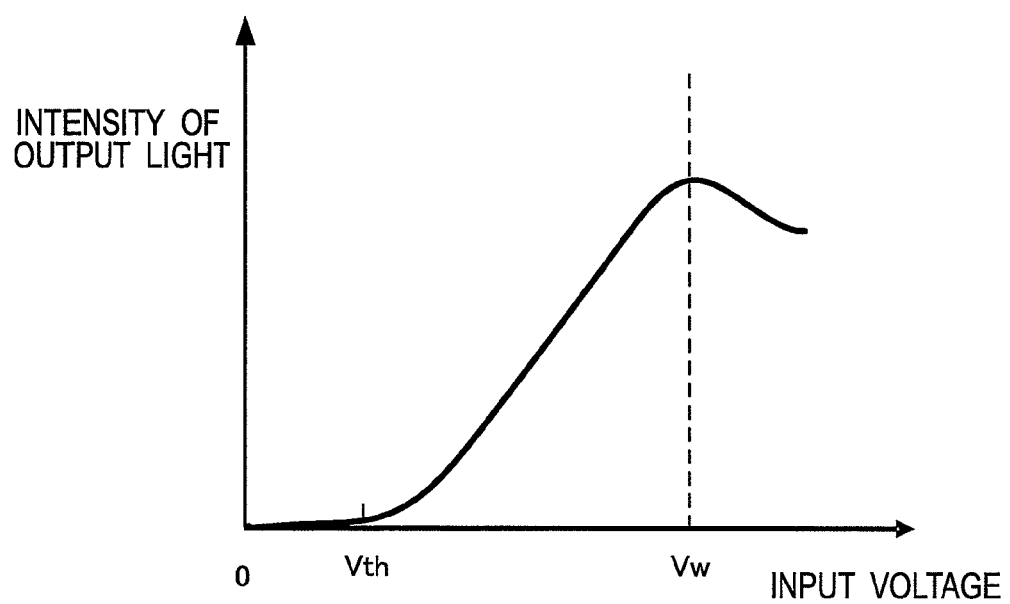
FIG. 3 is a view showing a relationship between an input voltage and an intensity of output light of a reflection type liquid crystal display element in a first embodiment.

FIG. 3 is a view showing a relationship between an input voltage and an intensity of output light of the reflection type liquid crystal display element 6 in each embodiment below. In FIG. 3, the horizontal axis represents an input voltage, indicating a potential difference between the pixel electrode 8 and the counter electrode 10, that is, the driving voltage for the liquid crystal 9. The vertical axis represents the intensity of output light emitted from the liquid crystal 9. A voltage at which the intensity of output light emitted from the liquid crystal 9 starts to increase is a threshold voltage Vth. When a voltage is 0 (e.g., both the pixel electrode 8 and the counter electrode are at GND), the intensity of output light is low and in a black state (blanking voltage), and a voltage at which the output light starts to be saturated is a saturation voltage Vw (white level).

First Embodiment

Figure 4:
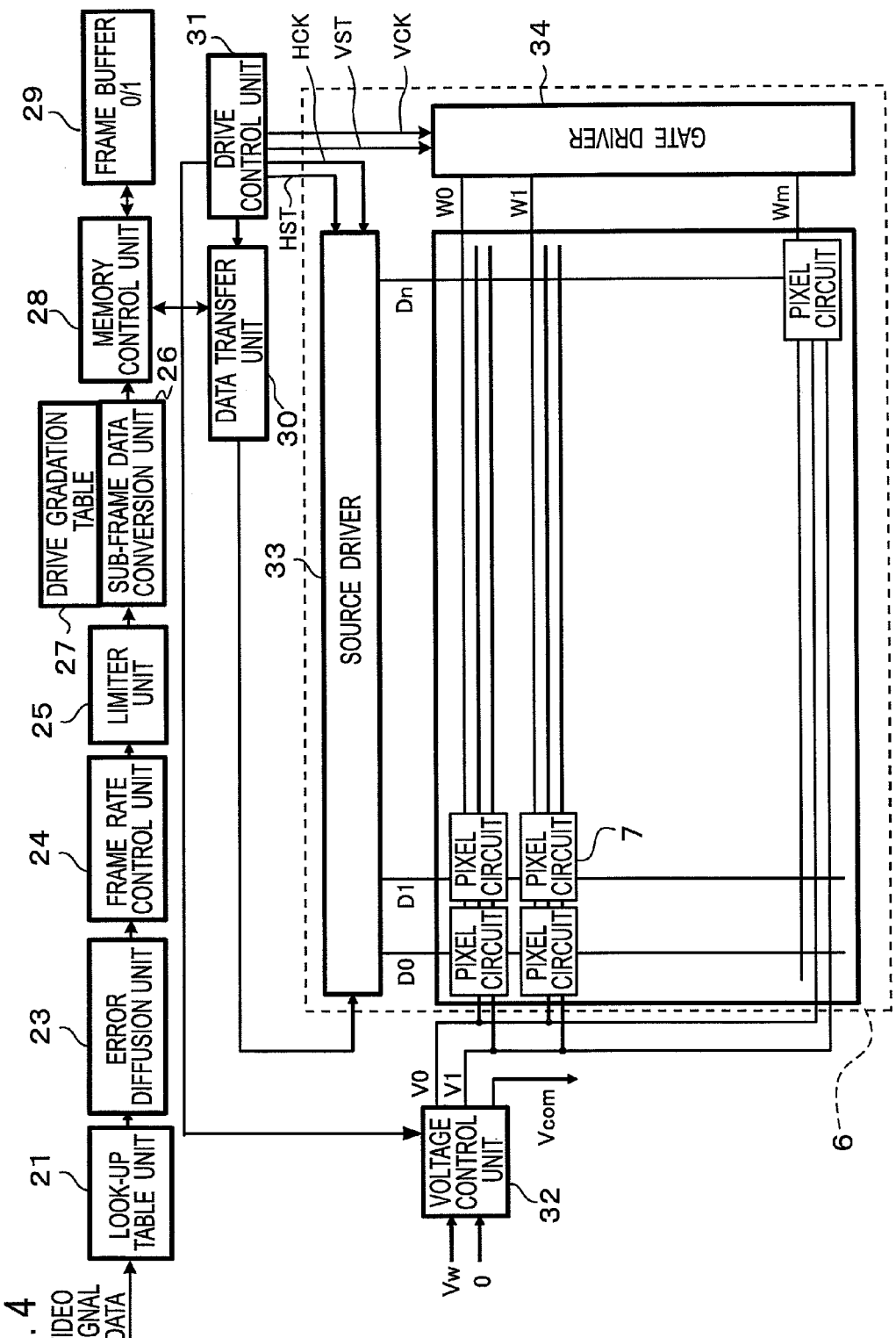
FIG. 4 is a block diagram showing a driving circuit (driving device) according to the first embodiment.
Figure 5:
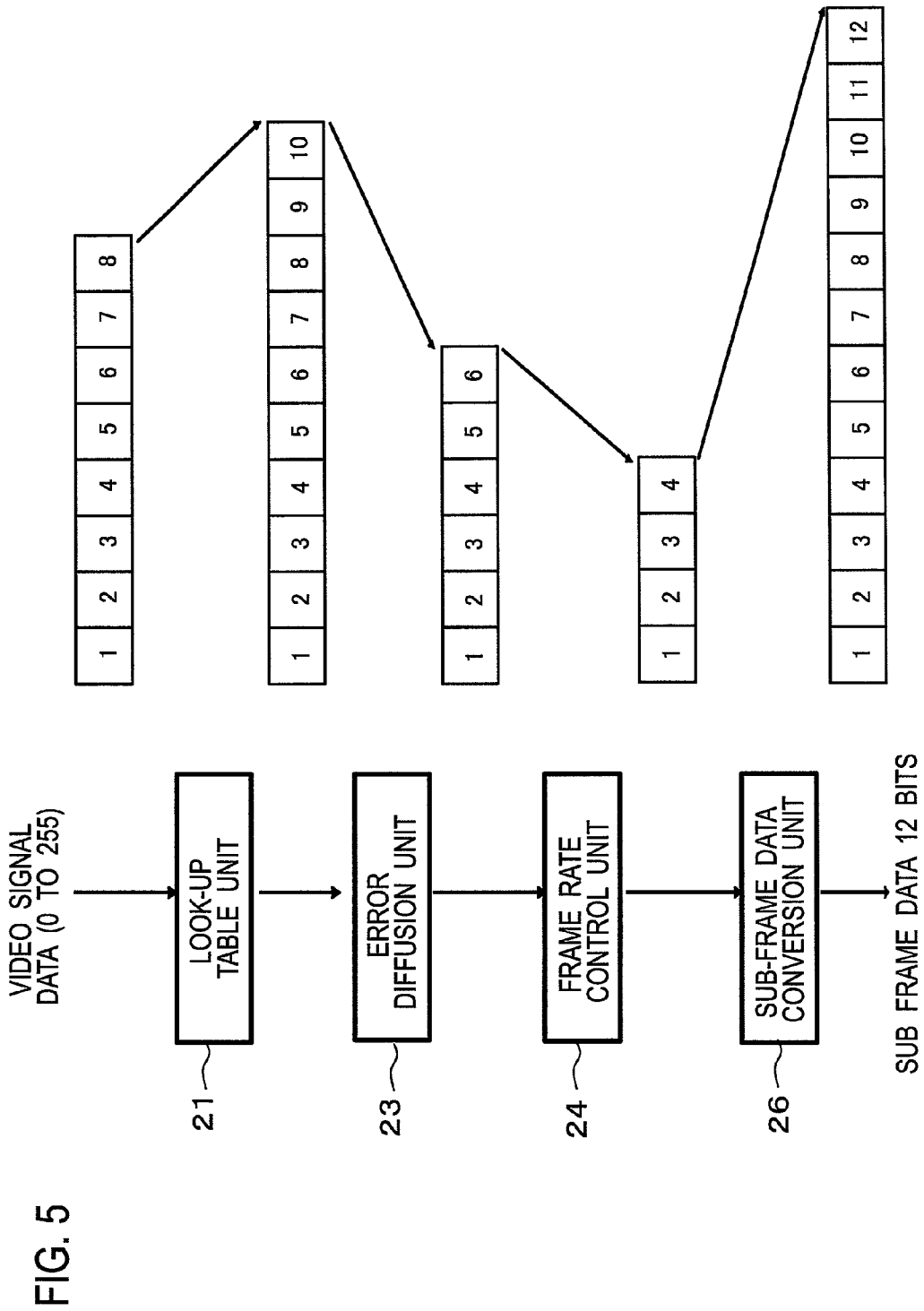
FIG. 5 is a view for illustrating a gradation expression in the first embodiment.
Figure 6:
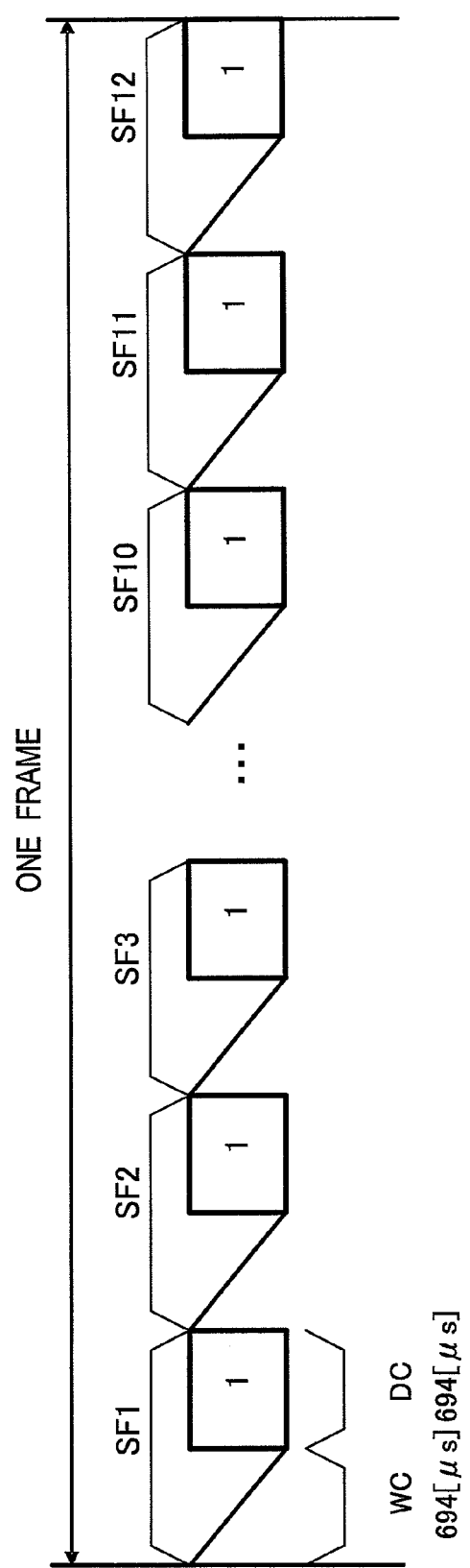
FIG. 6 is a view showing a driving pattern in the first embodiment.
Figure 8:
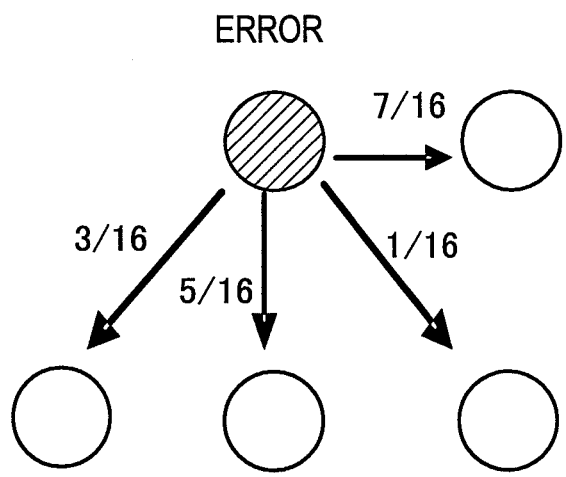
FIG. 8 is a view showing an error diffusion diagram in the first embodiment.
Figure 9:
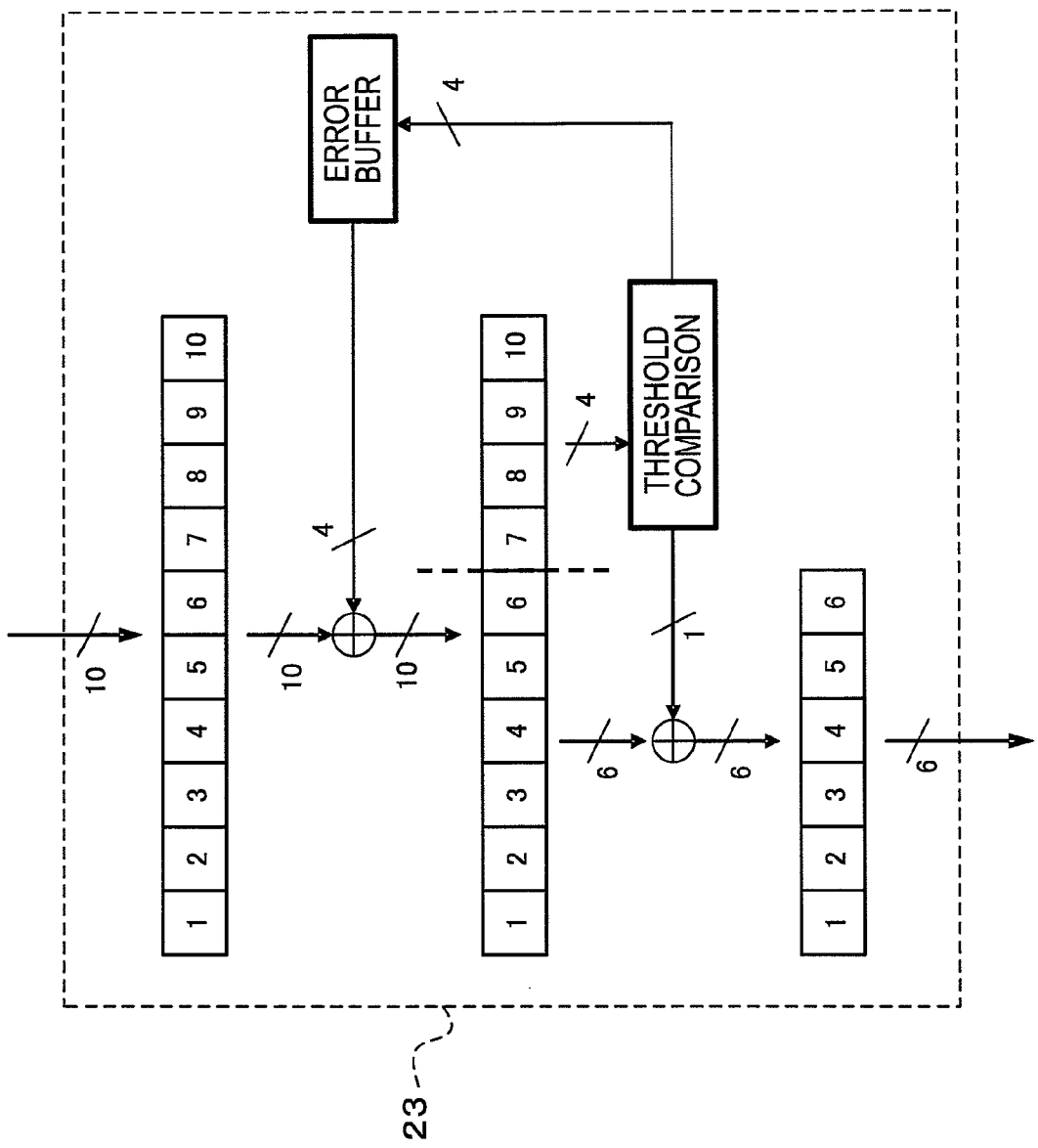
FIG. 9 is a view showing an error diffusion flow in the first embodiment.
Figure 10:
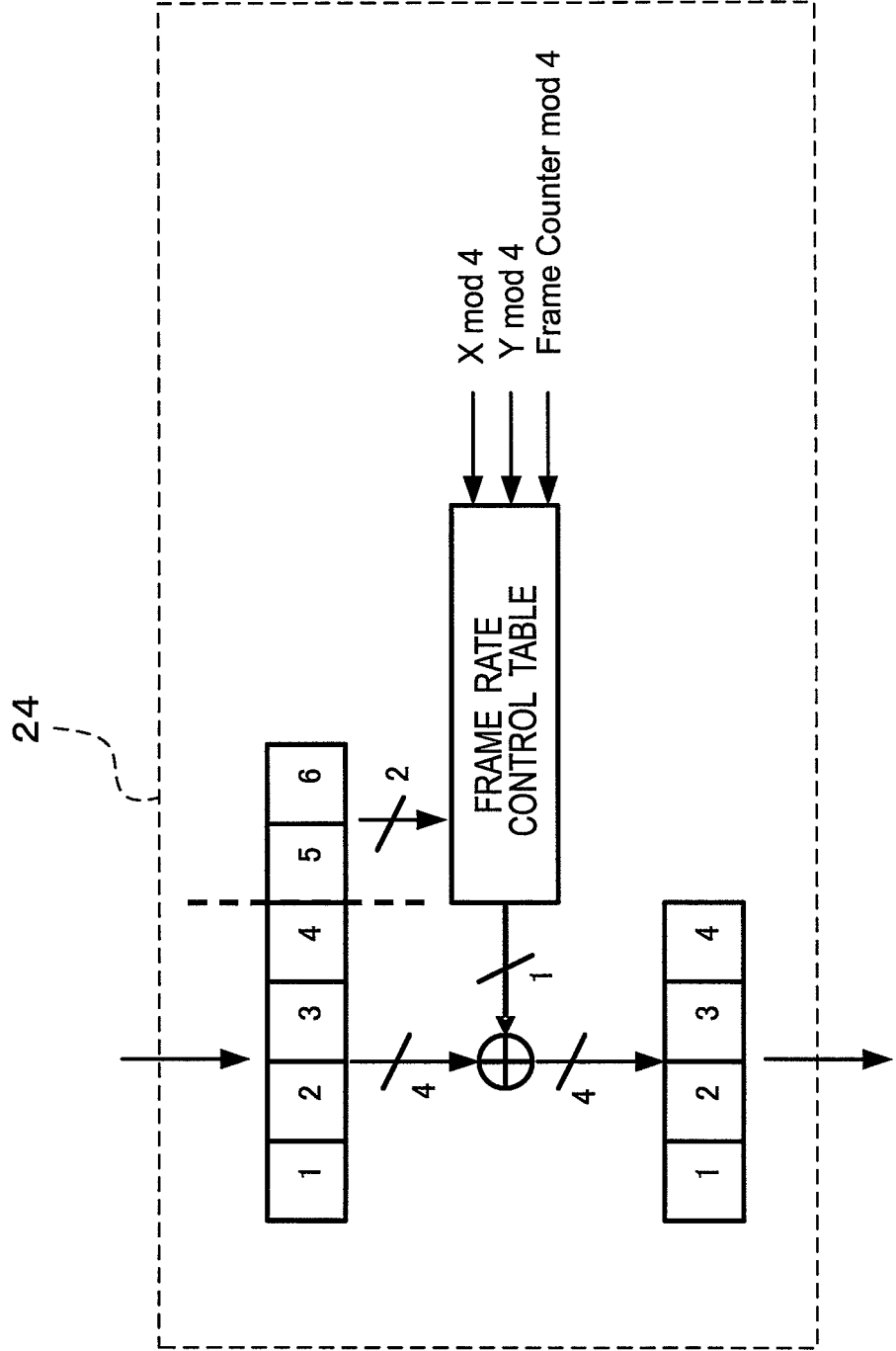
FIG. 10 is a view showing a frame rate control flow in the first embodiment.
Figure 11:
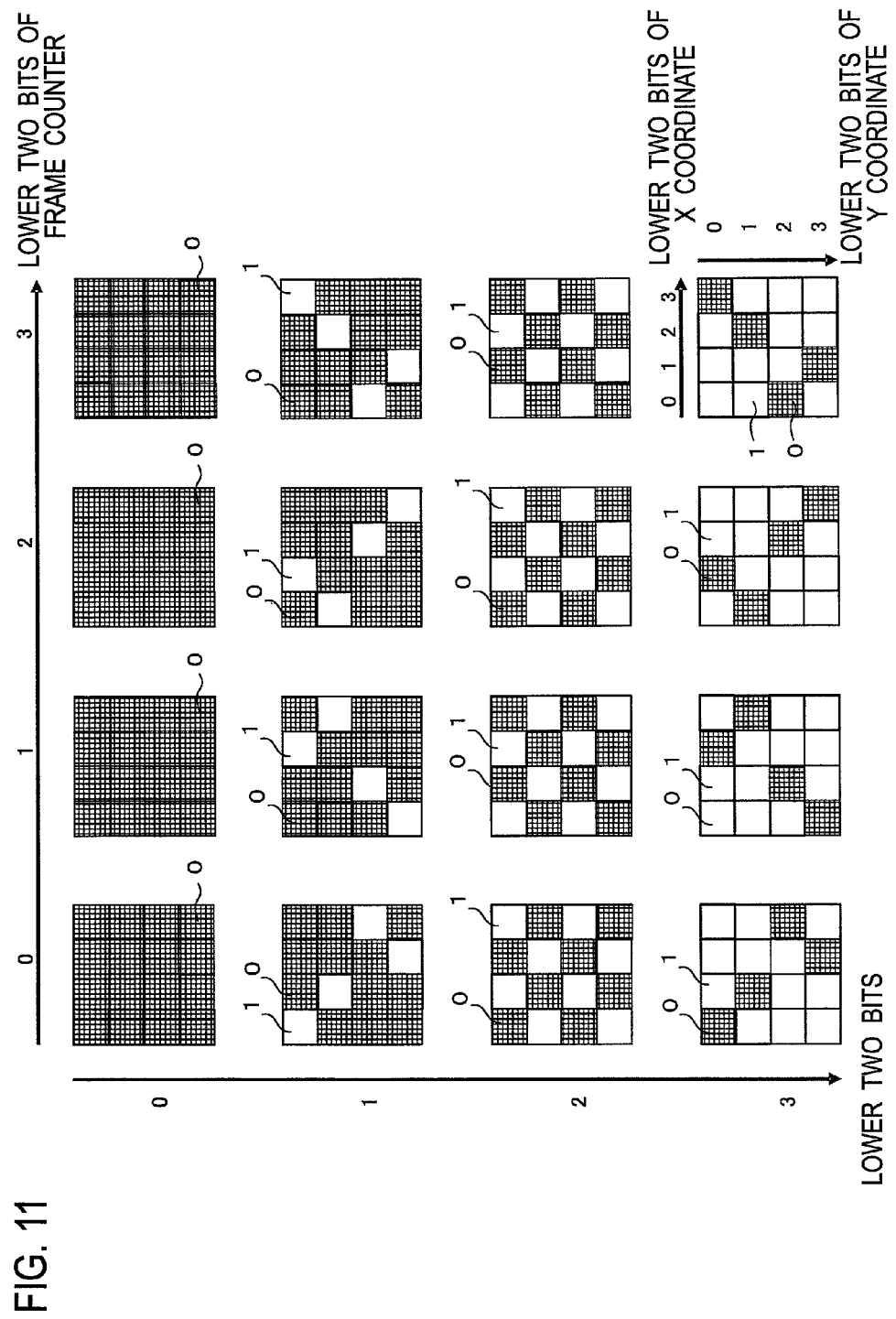
FIG. 11 is a view showing a frame rate control table in the first embodiment.

FIG. 4 is a block diagram showing a driving circuit (driving device) according to a first embodiment. FIG. 5 is a view for illustrating a gradation expression in the first embodiment. FIG. 5 shows an example of the gradation expression in each processing unit when the number of bits of input video signal data is set to 8 bits. FIG. 6 is a view showing a driving pattern in the first embodiment. FIG. 7 is a view showing a drive gradation table in the first embodiment. FIG. 8 is a view showing an error diffusion diagram in the first embodiment. FIG. 9 is a view showing an error diffusion flow in the first embodiment. FIG. 10 is a view showing a frame rate control flow in the first embodiment. FIG. 11 is a view showing a frame rate control table in the first embodiment.

In FIG. 4, input video signal data of N bits is converted into data of (M+F+D) bits by a look-up table unit 21, in which (M+F+D) is larger than N. Here, M represents the number of bits when the number of sub-frames is expressed in binary, D represents the number of bits to be interpolated by an error diffusion processing unit 23, and F represents the number of bits to be interpolated by a frame rate control unit 24. Note that N, M, F, and D are integers.

In the example of FIG. 5, the number of bits of input video signal data is 8 bits (N=8), the number of bits interpolated by the error diffusion processing unit 23 is 4 bits (D=4), and the number of bits interpolated by the frame rate control unit 24 is 2 bits (F=2). The number of bits when the number of sub-frames is expressed in binary is 4 bits (M=4), and the number of drive gradations is 12 (not including black).

Here, the operation of the look-up table unit 21 will be described. Usually, gamma correction is performed on a video signal. On the image display apparatus side, inverse gamma correction is required to be subjected to a gamma-corrected video signal, to thereby bring back to a linear gradation. The inverse gamma correction is a correction such that, with respect to an input X, the output becomes the 2.2th power of X. In this case, hereinafter, the output property is expressed as "gamma 2.2". The look-up table unit 21 has the function of converting an input-output property of the reflection type liquid crystal display element 6 to realize a liquid crystal display apparatus having an output property of gamma 2.2. The look-up table is adjusted in advance so that the output of 10 bits becomes an arbitrary output property (e.g., gamma 2.2). For example, in the first embodiment, an image made by each driving of 12 drive gradations (not including black) shown in FIG. 7 is projected by the liquid crystal display apparatus shown in FIG. 1, and the luminance on the screen 13 is measured in advance with an luminance meter or the like, respectively. By linearly interpolating the luminance between the respective drive gradations by using 6 bits (F+D=6) (64 gradations), the luminance data for each of 0 to 768 gradations is predicted. It is assumed that 256 pieces of data that serve as an arbitrary output property (e.g., gamma 2.2) are selected from these luminance data and are held as the look-up table in advance.

The look-up table unit 21 has a look-up table of 256×10 bits (that is, "the 8th power of 2" gradations×(4+2+4) bits). Here, "the 8th power of 2" gradations×(4+2+4) bits correspond to "the Nth power of 2" gradations×(M+F+D) bits having the values of N=8, M=4, F=2, and D=4 substituted thereinto. The look-up table unit 21 converts the input 8-bit image data into 10-bit data and outputs this result.

Returning to FIG. 4, the video signal data converted into (M+F+D) bits by the look-up table unit 21 is converted into data of (M+F) bits by diffusing the lower D bits of information to the peripheral pixels by the error diffusion unit 23. In the example of FIG. 5, the lower 4 bits of information of the converted 10-bit data are diffused to the peripheral pixels by the error diffusion unit 23, and the resulting 10-bit data is quantized into the upper 6-bit data and is output.

The error diffusion method is a method for compensating the insufficiency of gradation by diffusing, to the neighboring pixels, an error (display error) between a video signal to be displayed and an actually displayed value. In the first embodiment, the lower 4 bits of the video signal to be displayed is set to the display error, and as shown in FIG. 8, $7/16$ of the display error is added to the right neighboring pixel, $3/16$ of the display error to the lower left pixel, $5/16$ of the display error to a pixel directly thereunder, and $1/16$ of the display error to the lower right pixel.

The operation of the error diffusion unit 23 will be described in more detail in FIG. 9. The error of a video signal at a certain coordinate is diffused as described above while an error which the previous video diffused is added to the video signal at a certain coordinate. First, the error which the previous video diffused is added to the input 10-bit data by an error buffer. After the value of the error buffer is added to the input video signal data, the resulting data is divided into the upper 6 bits and the lower 4 bits.

The values of the divided lower 4 bits are shown below. The value on the right-hand side is the display error.

| Lower 4 bits | Display error |
|---|---|
| 0000 | 0 |
| 0001 | +1 |
| 0010 | +2 |
| 0011 | +3 |
| 0100 | +4 |
| 0101 | +5 |
| 0110 | +6 |
| 0111 | +7 |
| 1000 | −7 |
| 1001 | −6 |
| 1010 | −5 |
| 1011 | −4 |
| 1100 | −3 |
| 1101 | −2 |
| 1110 | −1 |
| 1111 | 0 |

The display error corresponding to the value of the divided lower 4 bits is added to the error buffer and is held, as shown in FIG. 9. Moreover, the value of the divided lower 4 bits is compared with a threshold, and when the value is equal to or greater than 1000 (in a line, in which the value of the left column of the above-mentioned table is 1000, and in the lines thereafter), 1 is added to the value of the upper 6 bits. Then, the upper 6-bit data is output from the error diffusion unit.

Returning to FIG. 4, the video signal data converted into (M+F) bits by the error diffusion unit 23 is input to the frame rate control unit 24. The frame rate control unit 24 includes a frame rate control table. In the frame rate control unit 24, the position in the frame rate control table is identified from the value of the lower F bits, the positional information of a pixel, and the count information of a frame, and this value (the value of 1 or 0, hereinafter denoted by 0/1) is added to the upper M bits, and is converted into data of M bits. Here, the frame rate control scheme is a scheme, in which for display of one pixel of a display element, m (m≥2, m is a natural number) frames are set to one cycle, and in n (n>0, m>n, n is a natural number) frames of the cycle, "ON-display (a pixel is turned on)" is performed, while in the remaining (m−n) frames, "OFF-display (a pixel is turned off)" is performed, and thus a pseudo gradation is displayed.

In the example of FIG. 5, the 6-bit data output by the error diffusion unit 23 is input to the frame rate control unit 24. The frame rate control unit 24 derives a value of 0/1 from the frame rate control table by using the lower 2 bits of information, the positional information in a display area and the frame counter information, and adds the value of 0/1 to the value of the upper 4 bits that is separated from the input 6 bits.

The operation of the frame rate control unit 24 will be specifically described using FIG. 10. The input 6-bit data is divided into the upper 4 bits and the lower 2 bits. The value of "0" or "1" shown in the frame rate control table of FIG. 11 is identified using the value of a total of 8 bits of the lower 2 bits of the input 6-bit data, the positional information (that is, the lower 2 bits of an X coordinate and the lower 2 bits of a Y coordinate, which are coordinate data) in a display area of a pixel, and the lower 2 bits of the frame counter. The identified value of "0" or "1" is added to the upper 4-bit data, and this result is output as 4-bit data.

Returning to FIG. 5, the 4-bit data output from the frame rate control unit 24 is limited to 12, which is the maximum value of the drive gradation, by a limiter unit 25 shown in FIG. 4, and then the resulting data is converted by the sub-frame data conversion unit 26 into 12-bit data to be transferred to the reflection type liquid crystal display element 6. For the conversion to 12-bit data, a drive gradation table 27 is used.

Returning to FIG. 4, the 12-bit data output from the sub-frame data conversion unit 26 is stored by the memory control unit 28 into the frame buffer 29 that is divided for each sub-frame. The frame buffer 29 has a structure of a double buffer, in which while data is stored into a frame buffer 0, the data of a frame buffer 1 is transferred to the reflection type liquid crystal display element 6 via a data transfer unit, and in the next frame, the data of the frame buffer 0, which is stored during the period of the previous frame, is transferred to the liquid crystal display element 6 via a data transfer unit 30, and the output data from the sub-frame data conversion unit 26 of the input video signal data is stored into the frame buffer 1.

The drive control unit 31 controls the timing and the like of the processing for each sub-frame, issues a transfer instruction to the data transfer unit 30, and controls a gate driver 34. The data transfer unit 30, in accordance with an instruction from the drive control unit 31, instructs the memory control unit 28, and receives the data of a specified sub-frame from the memory control unit 28 and transfers the same to a source driver 33. The source driver 33, every time receiving one line of data from the data transfer unit 30, simultaneously transfers the same to corresponding pixel circuits 7 of the reflection type liquid crystal display element 6 by using column data lines D0 to Dn. At this time, in the gate driver 34, a row selection line Wy of a row specified by a vertical start signal (VST)/vertical shift clock signal (VCK) from the drive control unit 31 is activated, and then data is transferred to the pixels of all the columns of the specified row y.

A driving pattern in the first embodiment will be described using FIG. 6. FIG. 6 shows a case where the video signal includes 60 frames per second, and the number of sub-frames is 12. WC represents a data transfer period (WC period) in which the data for each sub-frame is transferred to all the pixels in a liquid crystal display element. DC represents a driving period (DC period) in driving a liquid crystal. The WC period is set to 694 [μs] and the DC period to 694 [μs]. In one frame, the WC period and the DC period alternately continue 12 times. The data of 0 or 1 assigned to the respective sub-frames in order of SF1, SF2, . . . , SF11, and SF12 temporally from the head of the sub-frames are transferred in the WC period, and the liquid crystal of all the pixels are driven in the DC period. When the data sampled and held in a pixel is 0, the pixel reaches a blanking state, while when it is 1, the pixel reaches a drive state.

Next, the drive gradation table in the first embodiment shown in FIG. 7 will be described. As with FIG. 6, the video signal includes 60 frames per second and the number of sub-frames is 12, and the data transfer period (WC period) is 694 [μs] and the driving period (DC period) is 694 [μs]. FIG. 7 shows states during the DC period for respective sub-frames with respect to drive gradations. The gradation in the vertical column of FIG. 7 is the 4-bit data obtained by the frame rate control unit 24, and is limited, by the limiter unit 25, to 12 that is the maximum value of drive gradation. SF1 to SF12 represent the order of sub-frames in one frame. "1" in the column of the DC period indicates a drive state. "0" in the column of the DC period indicates a blank state. When the gradation shown in the vertical column of FIG. 7 is 1, only SF1 that is the first sub-field reaches a drive state. When the gradation is 2, only SF1 and SF2 reach a drive state. Hereinafter, every time the gradation number increases and goes higher, the number of sub-frames to be in a drive state is increased, and in the case of 12 which is the highest gradation, all the sub-frames reach a drive state. In other words, as the gradation number increases, the number of sub-frames to be in a drive state is increased temporally backward.

FIG. 6 and FIG. 7 are characterized in that the step-bit pulses all having the same width are used without use of the binary bit pulse causing moving image pseudo-contours. The binary bit pulse is for performing the so-called "binary weighting" in which the weight is represented by $2^n$ (n=0, 1, 2, 3, . . . ), on each sub-field. In such a case where there are pulses with pulse width ratios of 1, 2, 4, 8, and 16, the luminance "18" can be expressed by setting pulses with pulse width ratios of [2, 16] to a drive state and setting pulses with pulse width ratios of [1, 4, 8] to a blanking state. In this example, through the use of five pulses, 31 levels of luminance can be expressed, that is, even a small number of pulses can express a large number of gradations. In contrast, the step-bit pulse refers to a pulse of the same weighting, such as 32, 32, 32, 32, 32, 32, and 32, when there are binary bit pulses of 1, 2, 4, 8, and 16. As compared with the case of using only binary bit pulses, the use of step-bit pulses in combination with the binary bit pulse provides an effect of alleviating the moving image pseudo-contour.

Incidentally, in the first embodiment, a projection type display apparatus including the active matrix type and reflection type liquid crystal display element 6 as a display element is being described as an example. Here, the feature in the case of driving a liquid crystal using the gradation driving table of FIG. 7 is described. In FIG. 7, it is assumed that the gradation is K. Then, SF1 to SFK are set to 1 (a drive state). The 1's of SF1 to SFK are regarded as indicating a substantially continuous on-state, and as a result, a relationship between K (gradation number) and output light depicts a curve substantially close to the relationship between the input voltage and the intensity of output light of the reflection type liquid crystal display element 6 shown in FIG. 3. This has a beneficial effect on the operation of the look-up table unit 21. That is, since the relationship between the input voltage and the intensity of output light of the reflection type liquid crystal display element 6 is relatively close to the curve of gamma 2.2 which the look-up table unit 21 aims at, the burden of converting the above relationship into the curve of gamma 2.2 at the look-up table unit 21 decreases. The above feature is the same also in a transmission type liquid crystal element.

Figure 12:
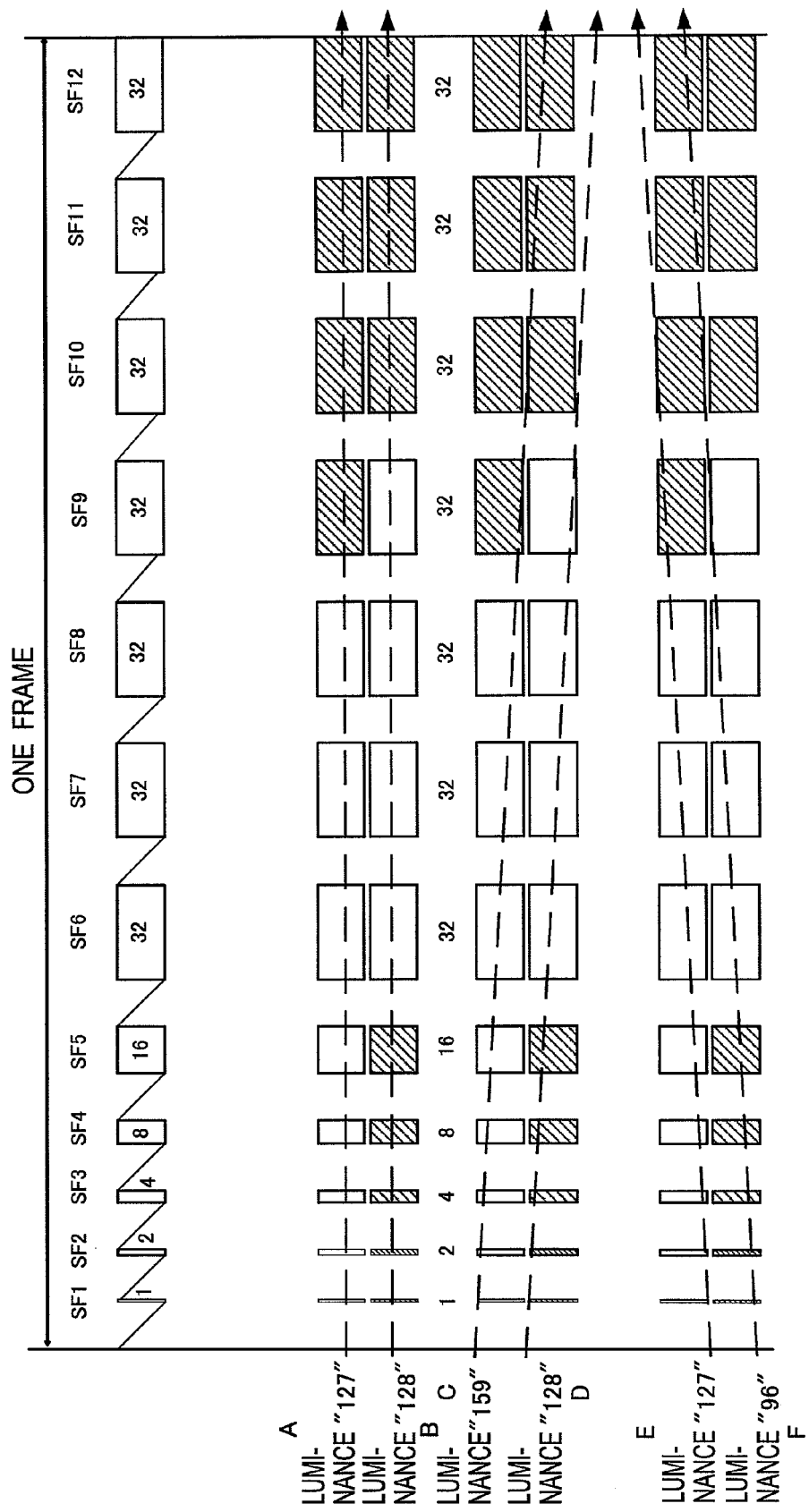
FIG. 12 is a view for illustrating the generation of moving image pseudo-contours in conventional digital driving.

FIG. 12 is a view for illustrating the generation of moving image pseudo-contours in the conventional digital driving. The number of sub-frames per frame is 12. In the case of the conventional digital driving, the binary bit pulses need to be used in order to express a large number of gradations. The moving image pseudo-contour refers to perception such as follows: in the case where in the similar gradations of the adjacent pixels, most of the binary bit pulses in one pixel are in a drive state and most of the binary bit pulses in the other pixel are in a blanking state, an unintended luminance is perceived by eyes when the line of sight is moved and/or when the zooming up or the like of a face is moved.

As shown in FIG. 12, for example, in such a case where pixels of gradations having similar luminance are adjacent to each other, an unintended luminance may be perceived when the line of sight is moved. In the example of FIG. 12, in the case where a pixel of the luminance "127" and a pixel of the luminance "128" are adjacent to each other, an intended luminance is perceived when the line of sight is A or B (when there is no move in the line of sight). However, when the line of sight is moved as in C or F, the luminance "159" is perceived in C or the luminance "96" is perceived in F. This phenomenon is referred to as the moving image pseudo-contour. In this phenomenon, in particular in such a case when a person's face moves, a line such as a contour line stands out along the contour of the face, causing image degradation.

Figure 13:
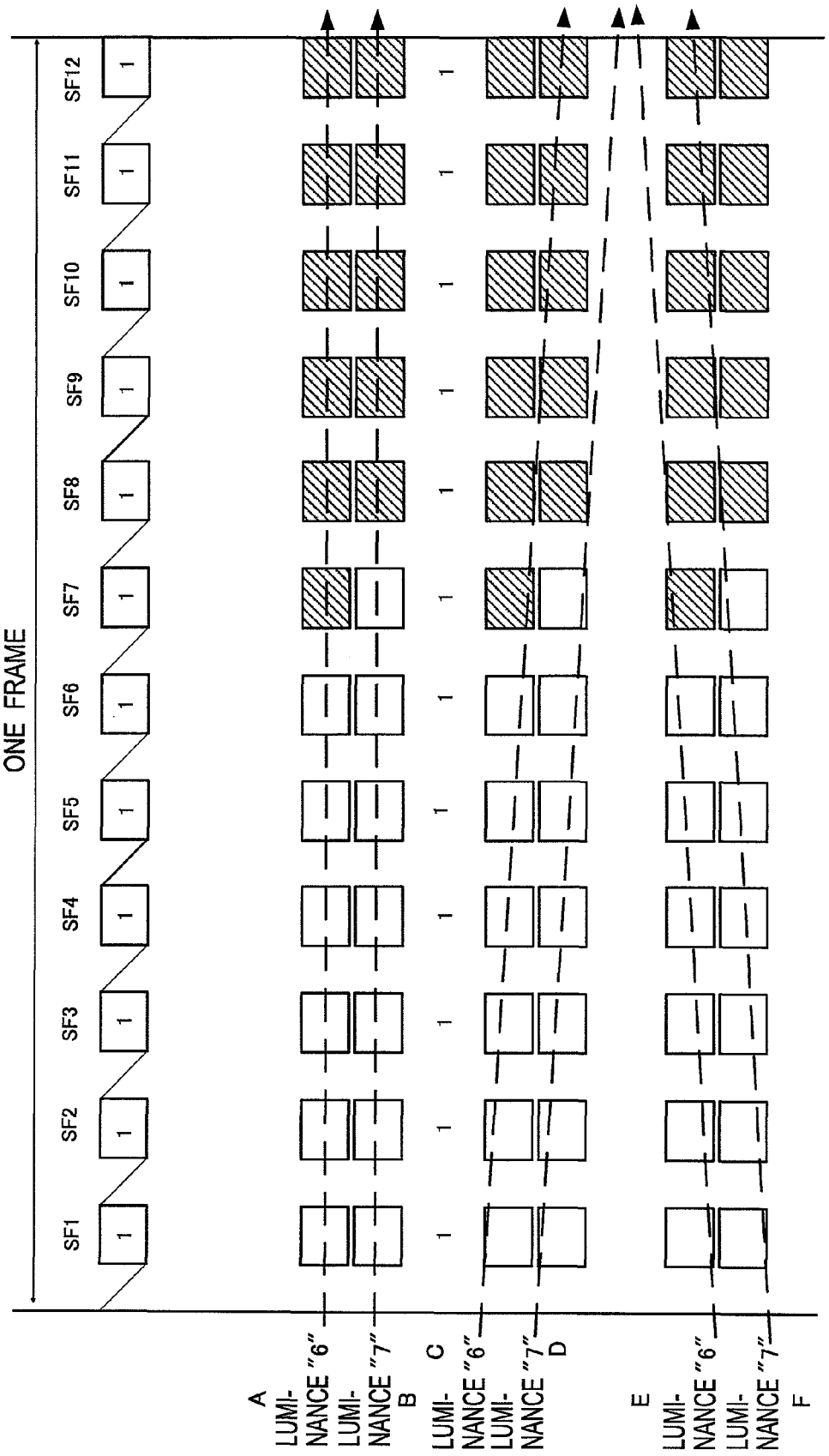
FIG. 13 is a view for illustrating moving image pseudo-contours in a liquid crystal display apparatus of the first embodiment.

FIG. 13 is a view for illustrating the moving image pseudo-contours in a liquid crystal display apparatus of the first embodiment. The eye-gaze direction is set to the same as the eye-gaze direction in the conventional example of FIG. 11. Since the luminance will not significantly vary even when the eye-gaze direction is moved, the moving image pseudo-contour is hardly perceived.

Figure 14:
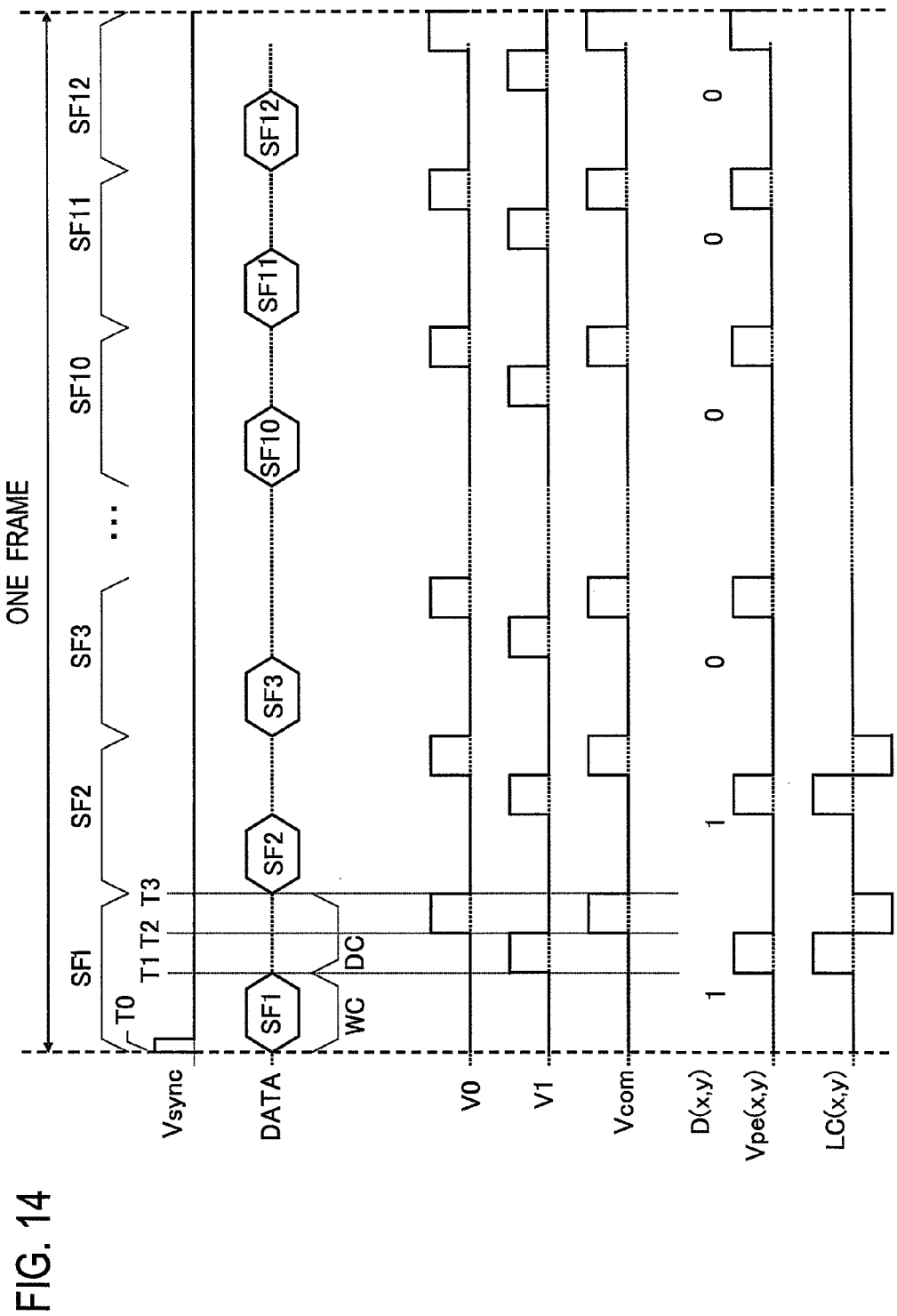
FIG. 14 is a view showing signal processing in the first embodiment.
Figure 15:
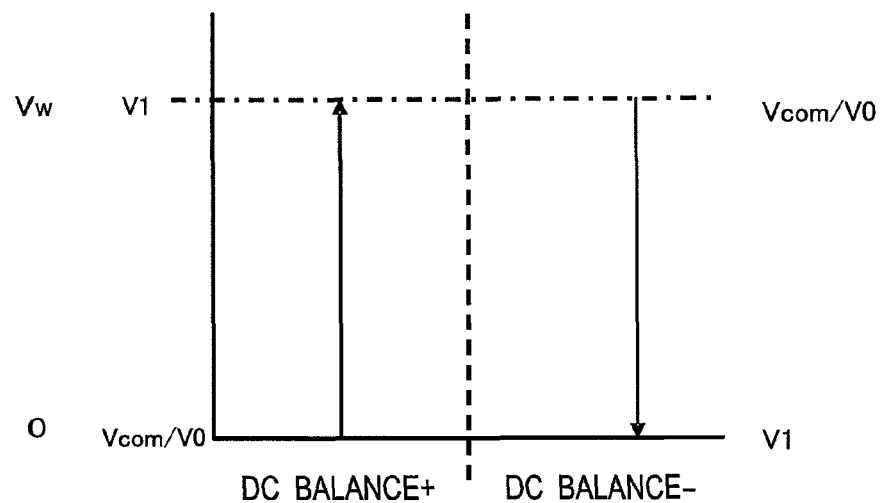
FIG. 15 is a view showing polarity inversion driving of the reflection type liquid crystal display element in the first embodiment.

FIG. 14 is a view showing signal processing in the first embodiment. FIG. 15 is a view showing polarity inversion driving of the reflection type liquid crystal display element 6 in the first embodiment.

Hereinafter, with reference to FIG. 2, FIG. 4, and FIG. 6, the signal processing will be described in FIG. 14. In FIG. 14, a vertical synchronization signal Vsync becomes active at a time instant T0, and first the data of the sub-frame 1 (SF1) is transferred to the reflection type liquid crystal display element 6 in a period from the time instant T0 to a time instant T1. This period (T0 to T1) serves as the transfer period WC. During the transfer period WC, the reflection type liquid crystal display element 6 needs to be set to a blanking state regardless of the sampled and held value in a pixel, and thus the same voltage (here, GND) is set to V0/V1/Vcom. Here, V0 is a blanking voltage, V1 is a driving voltage, and Vcom (common voltage) is a voltage of the counter electrode 10 of the liquid crystal. At the time instant T1, the transfer is completed, and the next period (T1 to T3) serves as the driving period DC. The time instant T2 is exactly at the midpoint of the period (T1 to T3), and thus the period (T1 to T2) and the period (T2 to T3) have the same time length. The control is made by a voltage control unit 32 so that in the period (T1 to T2), V1 becomes Vw and V0/Vcom become GND, and also so that in the period (T2 to T3), as opposed to the period (T1 to T2), V1 becomes GND and V0/Vcom become Vw.

When the sampled and held value within the pixel circuit 7 is "0", V0 is applied to the pixel electrode 8 by the voltage selection circuit 17 within the pixel circuit 7. In the period (T1 to T2), both a pixel electrode voltage Vpe and a counter electrode voltage Vcom become GND. The voltage LC applied to the liquid crystal 9 becomes 0 [v], and a drive state of the liquid crystal reaches a blanking state.

When the value sampled and held within a pixel is "1", V1 is applied to the pixel electrode 8 by the voltage selection circuit 17 within the pixel circuit 7. In the period (T1 to T2), the pixel electrode voltage Vpe becomes Vw, and the counter electrode voltage Vcom becomes GND. The voltage LC applied to the liquid crystal 9 becomes +Vw (counter electrode voltage reference), and a liquid crystal reaches a drive state. In the period (T2 to T3), the pixel electrode voltage Vpe becomes GND, the counter electrode voltage Vcom becomes Vw, the voltage applied to the liquid crystal 9 becomes −Vw (counter electrode voltage reference) and reaches a drive state.

By applying voltages (+Vw/−Vw) having the same voltage but different polarities to a liquid crystal for the same period, the voltage LC applied to the liquid crystal as an average for a long period of time is set to +Vw+(−Vw)=0 [v], thereby preventing the liquid crystal from burning. Also in SF2 to SF12, the voltage control as in the period (T0 to T3) of SF1 is performed. In FIG. 15, a state corresponding to the period (T1 to T2), that is, a state where V1 becomes Vw and V0/Vcom become GND, is denoted by DC balance+. Moreover, a state corresponding to the period (T2 to T3), that is, a state where V1 becomes GND and V0/Vcom become Vw, is denoted by DC balance−.

Figure 16:
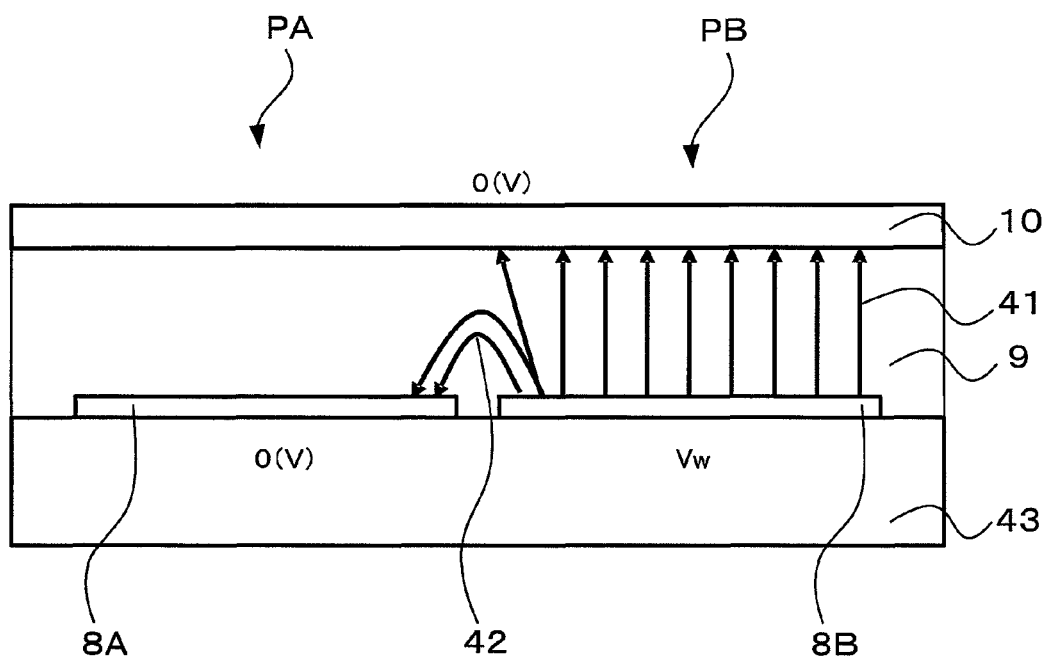
FIG. 16 is a view illustrating the generation mechanism of a lateral electric field in a reflection type liquid crystal element.

Next, an effect obtained by providing the frame rate control unit in the driving circuit of a liquid crystal display apparatus using a reflection type liquid crystal display element will be described. FIG. 16 is a view illustrating the generation mechanism of a lateral electric field in a reflection type liquid crystal element. As shown in FIG. 16, pixel electrodes 8A and 8B of the reflection type liquid crystal element are formed on a silicon substrate 43.

In the case of digital driving, a difference in drive states (driving/blanking) between adjacent pixels frequently occurs. For example, it is assumed that a case where the gradations of the adjacent pixels in a certain frame are "5" (a pixel PA) and "6" (a Pixel PB), respectively. Furthermore, consider a case where the counter electrode 10 is at V0 due to the DC balance+. That is, due to the DC balance+ in FIG. 15, V0=Vcom=0 (V) and V1=Vw. At the time instant of the sub-frame 6, the drive states of the adjacent pixels differ. As can be seen from FIG. 7, because the pixel PA is in a blanking state, the voltage of V0 is applied to the pixel electrode 8A, and because the Pixel PB is in a drive state, the voltage of V1 is applied to the pixel electrode 8B.

FIG. 16 shows a state of an electric field 41 of a liquid crystal layer when the voltage of V0 is being applied to the pixel electrode 8A and the voltage of V1 is being applied to the pixel electrode 8B. A potential difference is generated between the pixel electrode 8B (with the potential of Vw) of the Pixel PB and the counter electrode 10 (with the potential of 0 (V)), and thus the liquid crystal is rotated by a predetermined amount. At this time, a potential difference is also generated between the pixel electrode 8A (with the potential of 0 (V)) of the pixel PA and the pixel electrode 8B (with the potential of Vw) of the Pixel PB, and thus an electric field is generated in the horizontal direction. Such a lateral electric field 42 causes an unintended confusion in the movement of a liquid crystal between pixels. The above-described phenomenon is one of the causes of the image degradation.

Figure 17:
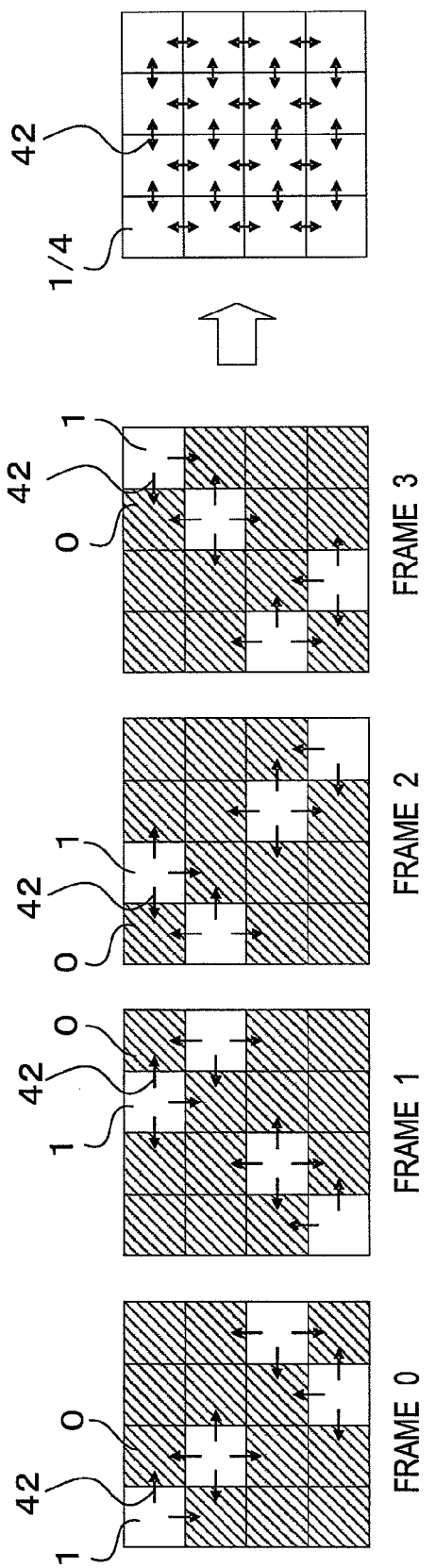
FIG. 17 is a view illustrating that lateral electric fields are equally dispersed by frame rate control.

The use of the frame rate control can dissolve the above-described problem. FIG. 17 is a view illustrating that the lateral electric fields are equally dispersed by the frame rate control.

FIG. 17 illustrates a case where the value of the lower F bits of the data ((M+F) bits) input to the frame rate control unit is "01". For each frame, four tables (frames 0 to 3) are used. In the respective frames, when a drive state (driving or blanking) differs between the adjacent pixels, a lateral electric field is generated in a direction from a pixel whose drive state is "1" (drive state) to a pixel whose drive state is "0" (blanking state). The direction of the lateral electric field between the pixels is indicated by an arrow in FIG. 17. A state where the lateral electric fields in four frames are superimposed is a rightmost state. That is, as an average in four frames, the lateral electric fields between all the pixels are canceled out each other. As described above, by using the frame rate control, the lateral electric field that is one of the causes of image degradation has been canceled out.

Second Embodiment

FIG. 18 is a view showing a drive gradation table in a second embodiment. The second embodiment is the same as the first embodiment except that the gradation driving table differs.

FIG. 18, as with FIG. 7, shows states in the DC period for respective sub-frames with respect to drive gradations. As with FIG. 7, a case is described where the video signal includes 60 frames per second and the number of sub-frames is 12. It is assumed that the data transfer period (WC period) is 694 [μs] and the driving period (DC period) is 694 [μs]. That is, the gradation in the vertical column of FIG. 18 is the 4-bit data obtained by the frame rate control unit 24 and limited, by the limiter unit 25, to 12 that is the maximum value of the drive gradation. SF1 to SF12 represent the order of sub-frames in one frame. "1" in the column of the DC period indicates a drive state. "0" the column of the DC period indicates the blank state. When the gradation shown in the vertical column of FIG. 18 is 1, only SF12 that is the last sub-field reaches a drive state. When the gradation is 2, only SF11 and SF12 reach a drive state. Hereinafter, every time the gradation number increases and goes higher, the number of sub-frames to be in a drive state is increased, and in the case of 12, which is the highest gradation, all the sub-frames reach a drive state. In other words, as the gradation number increases, the number of sub-frames to be in a drive state is increased temporally forward.

In the second embodiment, the effect that the moving image pseudo-contour is suppressed, the effect that the burden of converting the above relationship into the curve of gamma 2.2 by the look-up table unit 21 decreases, and the effect that the lateral electric field, which is one of the causes of image degradation, can be canceled out by using frame rate control are similar to those of the first embodiment.

Figure 19:
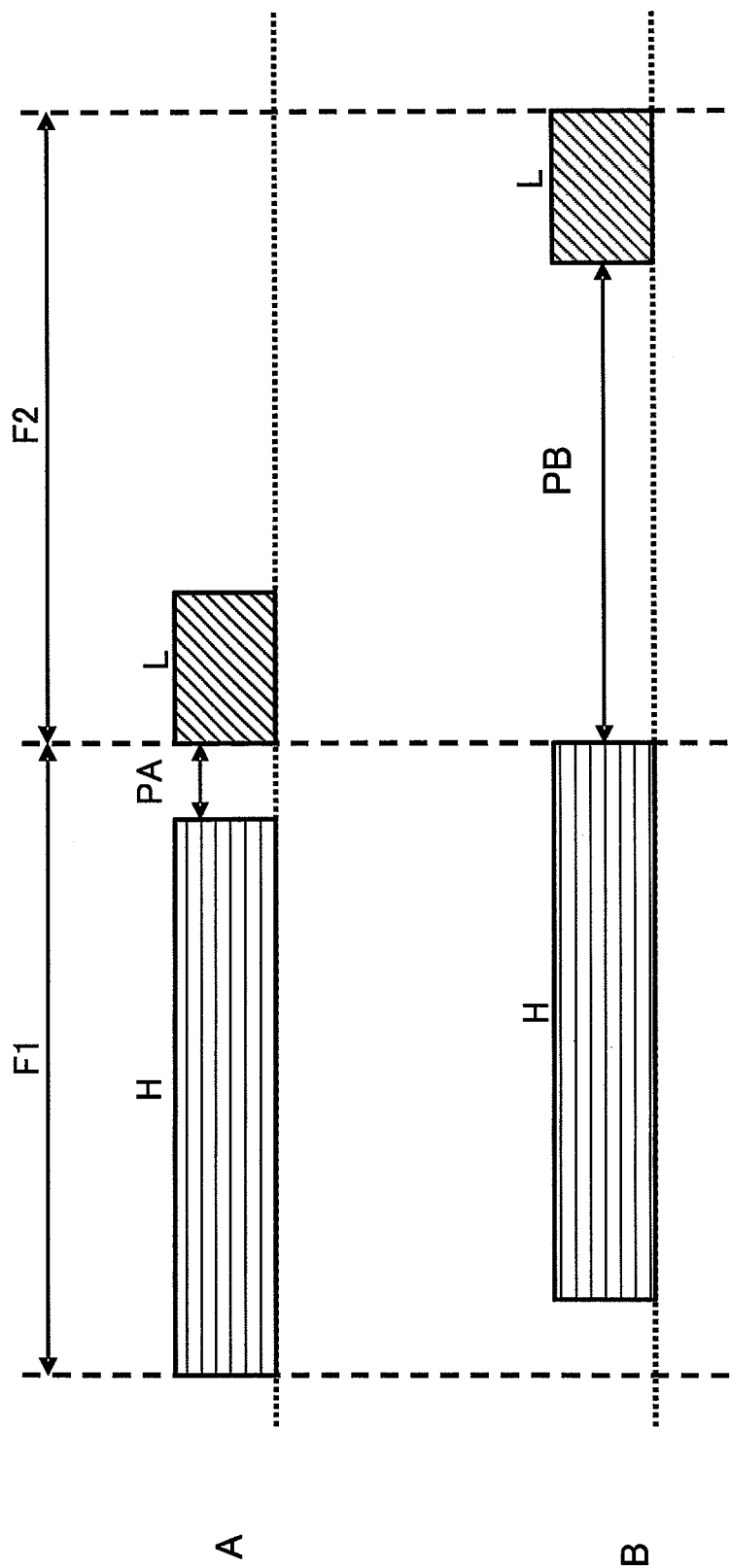
FIG. 19 shows such a case where a high gradation and a low gradation alternately continue in a video signal in the first embodiment and the second embodiment.

In the second embodiment, a new effect is obtained. FIG. 19 shows a case where a high gradation and a low gradation alternately continue in a video signal in the first embodiment and the second embodiment. In FIG. 19, F1 indicates the frame of a video at a certain time point, and F2 indicates the next frame of F1. H and L schematically show situations, where a video signal of a high gradation and a video signal of a low gradation are displayed in accordance with the gradation driving table of FIG. 7, respectively. In the case of the first embodiment (in the case of A of FIG. 19), since the blanking period (PA) after a long driving period of the high gradation (H) is short, the luminance displayed does not drop down to the black level due to a liquid crystal response of a liquid crystal display element, and thus the luminance displayed in the driving period of a low gradation (L) of the next frame is pushed above the luminance to be displayed. This causes image degradation. In the case of the second embodiment (in the case of B of FIG. 19), since the blanking period (PB) after a long driving period of the high gradation (H) is long, an effect is obtained that a state causing the image degradation as with the first embodiment is unlikely to occur.

Third Embodiment

FIG. 20 is a view showing a drive gradation table in a third embodiment. FIG. 21 shows an example of another view showing the drive gradation table in the third embodiment. The third embodiment is the same as the first embodiment except that the gradation driving table differs.

FIG. 20 and FIG. 21, as with FIG. 7, show states in the DC period for respective sub-frames with respect to drive gradations. As with FIG. 7, a case is described where the video signal includes 60 frames per second and the number of sub-frames is 12. The data transfer period (WC period) is 694 [μs] and the driving period (DC period) is 694 [μs]. That is, the gradation in the vertical column of FIG. 20 and FIG. 21 is the 4-bit data obtained by the frame rate control unit 24 and limited, by the limiter unit 25, to 12 that is the maximum value of drive gradation. SF1 to SF12 represent the order of sub-frames in one frame. "1" in the column of the DC period indicates a drive state. "0" in the column of the DC period indicates a blank state. In FIG. 20, SF6 of "1/0" and SF7 of "0/1" indicate that SF6 is in a drive state and SF7 is in a blanking state, or SF6 is in a blanking state and SF7 is in a blanking state.

When the gradation shown in the vertical column of FIG. 20 is 1, only SF6 (or SF7) in the center reaches a drive state. When the gradation is 2, only SF6 and SF7 reach a drive state. When the gradation is 3, only SF5, SF6, and SF7 (or SF6, SF7, and SF8) reach a drive state. Hereinafter, every time the gradation number increases, the number of sub-frames to be in a drive state is increased forward and backward, and in the case of 12, which is the highest gradation, all the sub-frames reach a drive state. In other words, as the gradation number increases, the number of sub-frames to be in a drive state increases sequentially from the gradation in the center to temporally forward or backward.

When the gradation shown in the vertical column of FIG. 21 is 1, only SF3 reaches a drive state. When the gradation is 2, only SF2 and SF3, or SF3 and SF4 reach a drive state. When the gradation is 3, only SF2, SF3 and SF4 reach a drive state. Hereinafter, every time the gradation number increases, the number of sub-frames to be in a drive state is increased forward and backward. When the gradation is 5, because SF1 reaches a drive state, the number of sub-frames to be in a drive state cannot be increased forward. Therefore, when the gradation is equal to or greater than 6, SF6 which is the frame after SF5 being in a drive state when the gradation is 5, reaches a drive state. Hereinafter, every time the gradation number increases, the number of sub-frames to be in a drive state is increased backward, and in the case of 12 which is the highest gradation, all the sub-frames reach a drive state.

In FIG. 21, when the gradation shown in the vertical column is 1, only SF3 reaches a drive state, but the sub-frames other than SF3 may reach a drive state, first. When SF1 or SF12 reaches a drive state at a certain gradation, the number of sub-frames to be in a drive state cannot be increased forward or backward, respectively. At that time, the sub-frame after or before a sub-frame being in a drive state at a certain gradation reaches a drive state at the next higher gradation. In other words, when the gradation is 1, an arbitrary sub-frame reaches a drive state, and as the gradation number increases, the number of sub-frames to be in a drive state sequentially is increased temporally forward or backward.

The third embodiment, as to the effect described in FIG. 19, has an effect obtained at the intermediate level between in the first embodiment and in the second embodiment. As to the other effects, the third embodiment has effects similar to the first embodiment.

Fourth Embodiment

Figure 22:
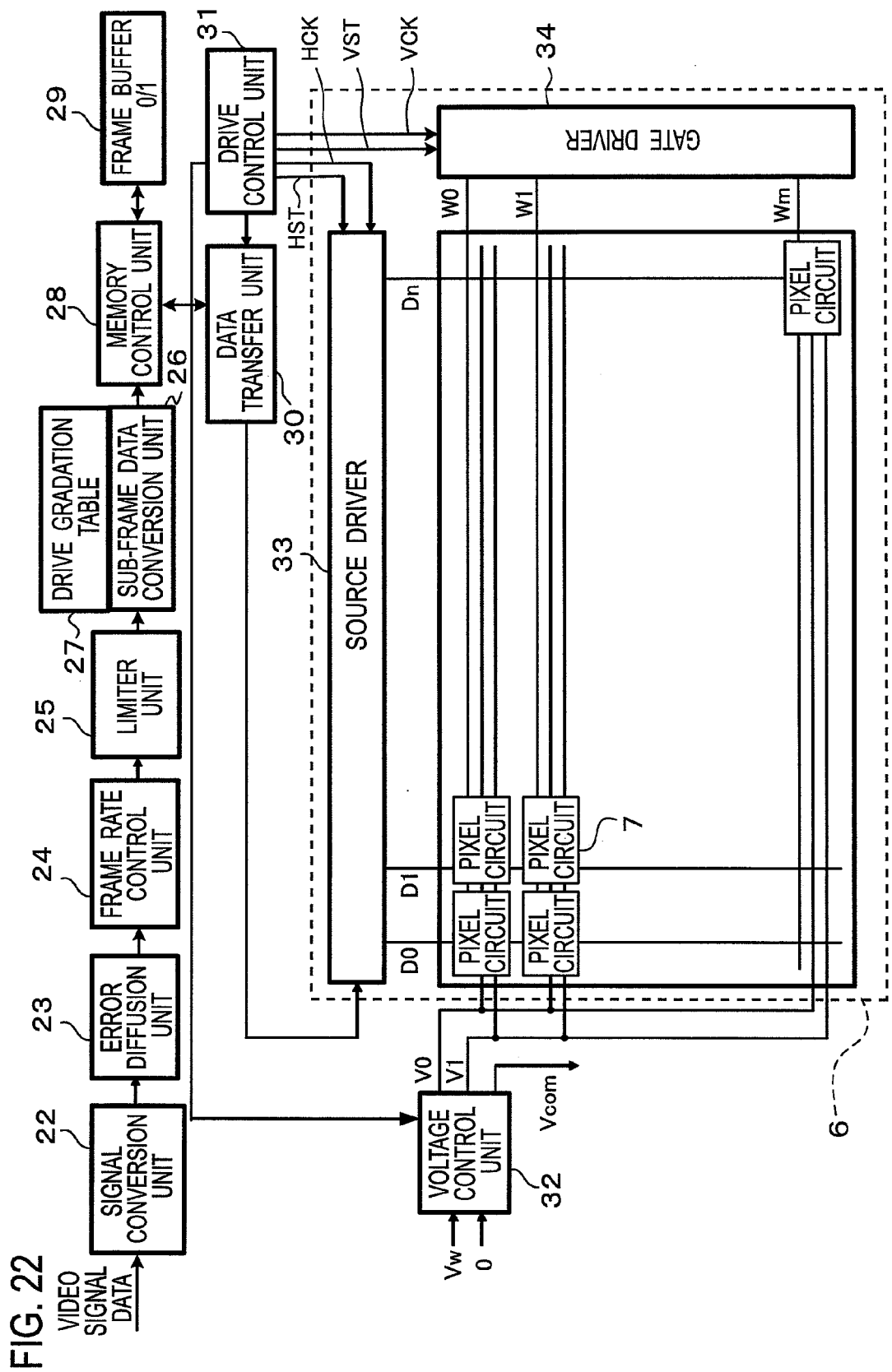
FIG. 22 is a block diagram showing a driving circuit (driving device) according to a fourth embodiment.

FIG. 22 is a block diagram showing a driving circuit according to a fourth embodiment. The driving circuit according to the present embodiment differs from the driving circuit of the first embodiment shown in FIG. 4 in that the look-up table unit 21 has been changed to a signal conversion unit 22. The configuration of the error diffusion unit 23 and thereafter is the same as the driving circuit of the first embodiment.

Figure 23:
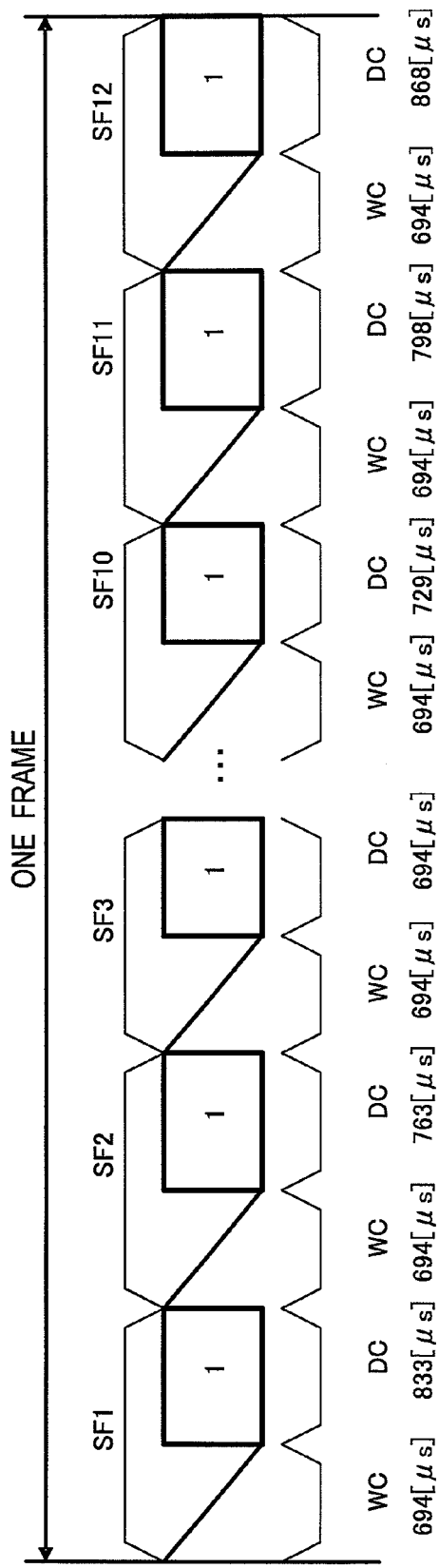
FIG. 23 is a view showing one example of the driving pattern in the fourth embodiment.

FIG. 23 is a view showing one example of the driving pattern in the fourth embodiment. In the driving pattern of the present embodiment, as with the driving pattern of the first embodiment, the video signal includes 60 frames per second and the number of sub-frames is 12, and the data transfer period (WC period) is 694 [μs]. In contrast, in the case of the first embodiment, the driving periods of all the sub-frames have the same time length, while the time period of the driving period (DC period) for each sub-frame in FIG. 23 differs.

Figure 24:
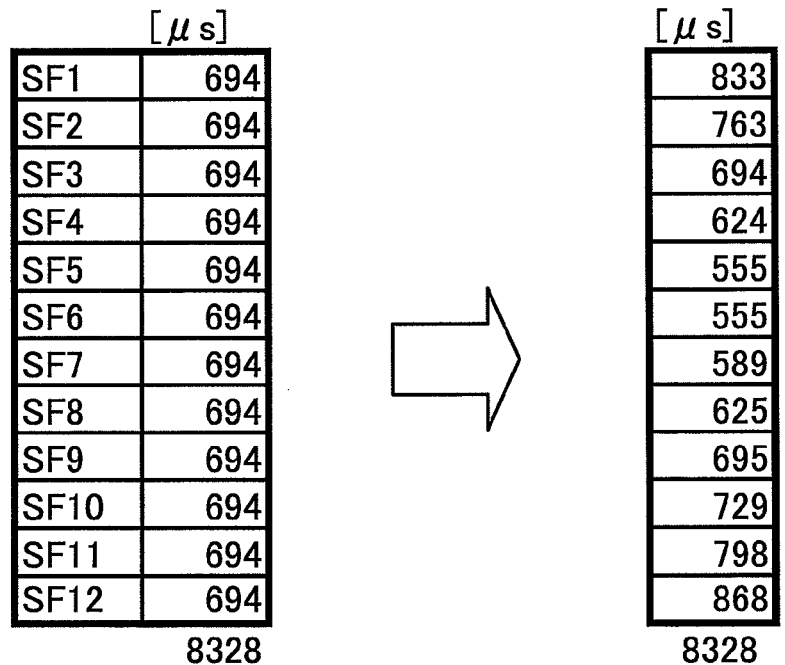
FIG. 24 is a view illustrating that the period for each sub-frame is varied in the fourth embodiment.

FIG. 24 is a view illustrating that the driving period (DC period) for each sub-frame in the fourth embodiment is changed from that in the first embodiment. In FIG. 23 and FIG. 24, the setting of the drive gradation follows the first embodiment. That is, when the gradation shown in the vertical column of FIG. 7 in the first embodiment is 1, only SF1 that is the first sub-frame reaches a drive state. When the gradation is 2, only SF1 and SF2 reach a drive state. Hereinafter, every time the gradation number increases and goes higher, the number of sub-frames to be in a drive state is increased, and in the case of 12 which is the highest gradation, all the sub-frames reach a drive state. In other words, as the gradation number increases, the number of sub-frames to be in a drive state is increased temporally backward.

Figure 25:
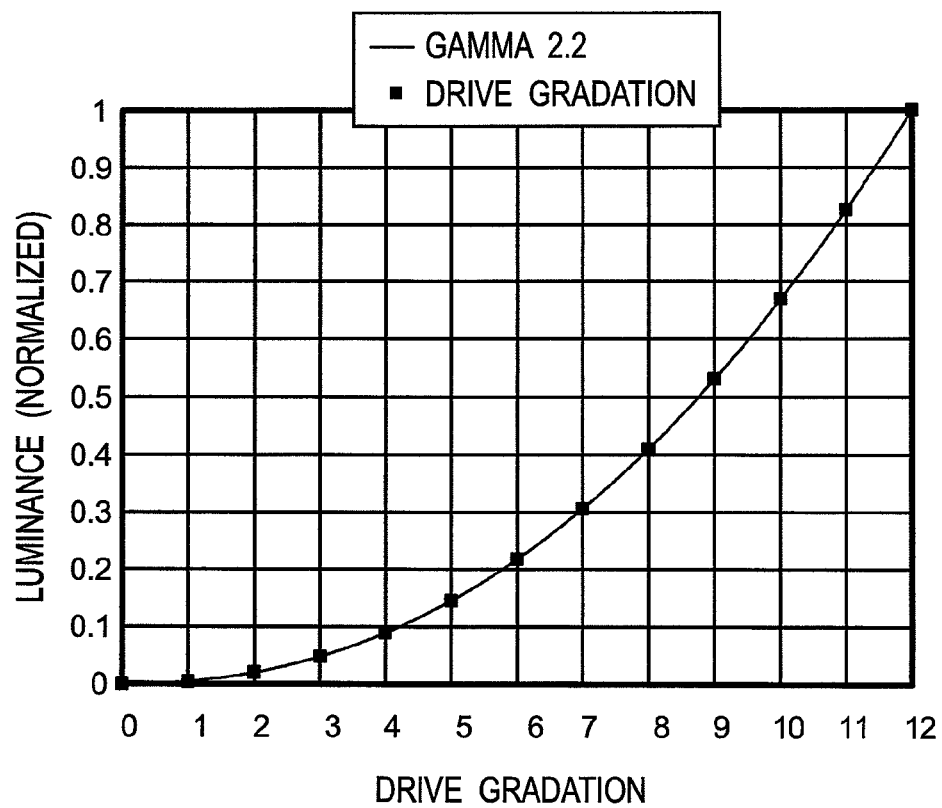
FIG. 25 is a view showing that the luminance for each drive gradation lies on a line of gamma 2.2 by adjusting each sub-frame period in the fourth embodiment.

In FIG. 24, a change of the period for each sub-frame from the first embodiment will be described below. The look-up table unit 21 of FIG. 4 has the function of converting the input-output property of the reflection type liquid crystal display element 6 and to realize a liquid crystal display apparatus having an input-output property of gamma 2.2. In the fourth embodiment, the input-output property conversion function is performed by "varying the time length of the driving period (DC period) for each sub-frame." Hereinafter, this function will be specifically described. FIG. 25 is a view showing that the luminance for each drive gradation lies on a line of gamma 2.2 by adjusting each sub-frame period in the fourth embodiment. In the fourth embodiment, the DC period for each sub-frame is set as in FIG. 24 in advance so that, for example, the luminance property for each drive gradation lies on the line of gamma 2.2 as in FIG. 25.

As a result of the setting described above, the function of inverse gamma correction can be omitted in the look-up table unit. As a result, it is possible to change from the look-up table unit 21 using a look-up table, to the signal conversion unit 22 without using a look-up table. The change from the look-up table unit 21 to the signal conversion unit 22 has an effect of cost reduction.

Hereinafter, the signal conversion unit 22 will be described. In the fourth embodiment, an interpolated drive gradation itself has a luminance property of gamma 2.2, and thus from a relational expression:

input gradation X: interpolated drive gradation Y=255 (the maximum input gradation): 768 (the maximum interpolated drive gradation), a calculation formula:

output data Y: (M+F+D) bits=input data X×768/255 can be used. Here, the value 768 represents the maximum interpolated drive gradation (i.e., 1100000000) and the value 255 represents the maximum drive gradation. Furthermore, the drive gradation represents the gradation at a single element shown in FIGS. 7, 18, 20, and 21. Moreover, the interpolated drive gradation represents a gradation including a pseudo gradation which is interpolated by the error diffusion unit and the frame rate control unit. Then, the signal conversion unit 22 calculates video signal data to be input through the use of the above-described calculation formula.

Note that, in the fourth embodiment, as to the setting of the drive gradation, the settings as in the second and third embodiments are also possible. That is, in the same way as in the second embodiment (FIG. 18), a setting in which, as the gradation number increases, the number of sub-frames to be in a drive state is increased temporally forward, and in the same way as in the third embodiment (FIG. 20 and FIG. 21), a setting in which, as the gradation number increases, the number of sub-frames to be in a drive state is increased sequentially from the sub-frame in the center or from an arbitrary sub-frame, toward temporally the forward and the backward thereof, are possible. In this case, the DC period of each sub-frame is changed as follows.

For example, in the case of the setting corresponding to the second embodiment (FIG. 18), as to the DC period for each sub-frame, the arrangement of numerical values is set upside down in the drawing on the right-hand side of FIG. 24. That is, SF12 is set to be 833 [µs], SF11 is set to be 763 [µs], . . . , SF2 is set to be 798 [µs], and SF1 is set to be 868 [µs] in advance.

Furthermore, for example, in the case of the setting corresponding to FIG. 20 in the third embodiment, the upper-side numerical values of FIG. 24 are distributed sequentially from the sub-frame in the center. Specifically, in FIG. 20, the driving time of SF6 (or SF7) in the center is set to 833 [µs], the driving time of SF7 (or SF6) is set to 763 [µs], and the driving time of SF5 (or SF8) is set to 694 [µs]. Finally, the driving period of SF1 (or SF12) is set to 798 [µs], and the driving period of SF12 (or SF1) is set to 868 [µs].

Moreover, the fourth embodiment also has the same effects as that of the first embodiment. In the fourth embodiment, when the drive gradations are set in the same way as in the second embodiment, the effect described in FIG. 19 is obtained. When the drive gradations are set in the same way as in the third embodiment, the fourth embodiment has an effect obtained at the level intermediate between in the first embodiment and in the second embodiment, with regard to the effect described in FIG. 19.

Fifth Embodiment

Figure 26:
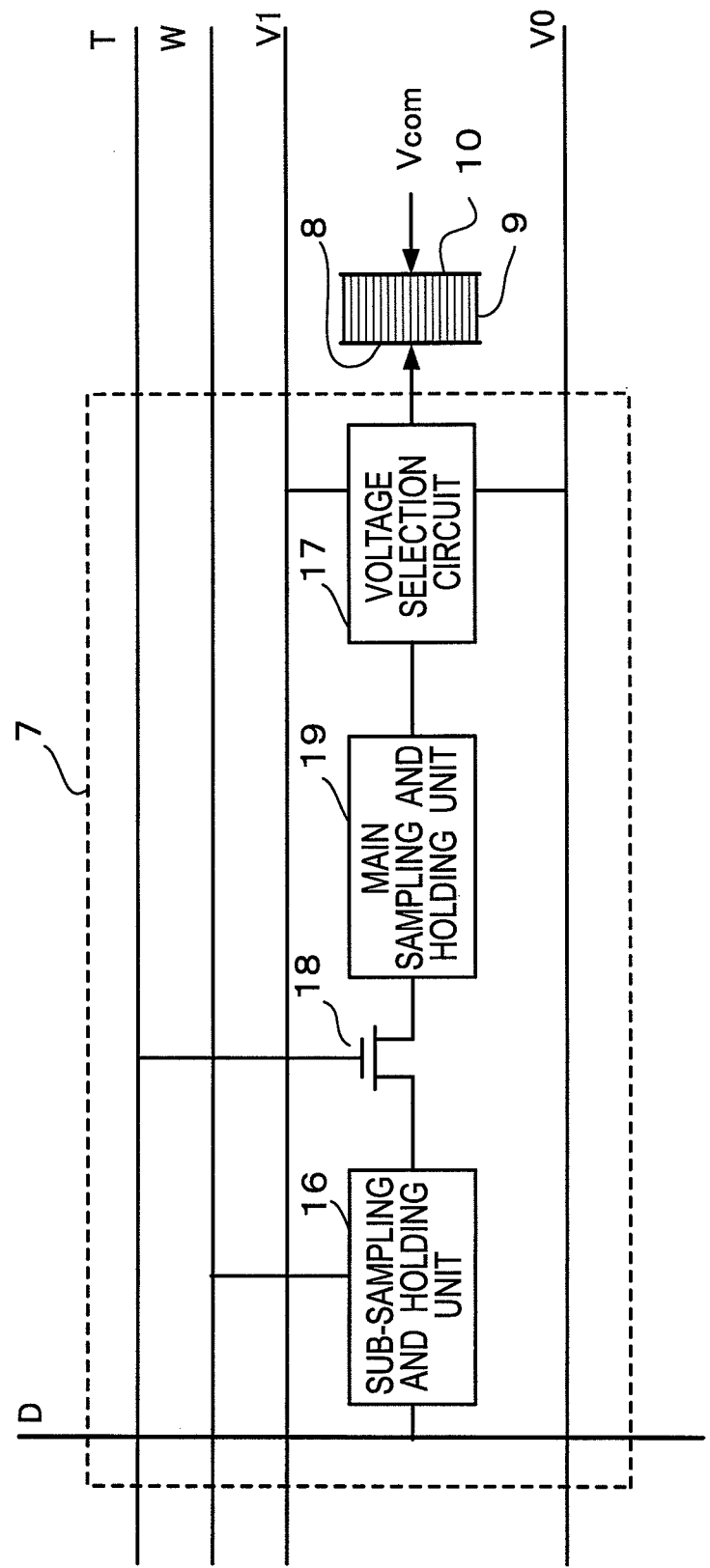
FIG. 26 is a view showing a driving circuit configuration of each pixel in a digital-driven reflection type liquid crystal display element according to a fifth embodiment.

FIG. 26 is a view showing the configuration of a driving circuit of each pixel in the digital-driven reflection type liquid crystal display element 6 of a fifth embodiment. As compared with the circuit configuration described in FIG. 2, the sampling and holding unit is doubled, and a transferring switch unit and a transferring line are added. The individual pixel of the reflection type liquid crystal display element 6 has a structure in which the liquid crystal 9 is interposed between the pixel electrode 8 and the counter electrode 10. The pixel circuit 7 indicated by a dotted line includes a sub-sampling and holding unit 16, a voltage selection circuit 17, a transferring switch unit 18, and a main sampling and holding unit 19. The sub-sampling and holding unit 16 and the main sampling and holding unit 19 include a flip-flop of an SRAM structure. The sub-sampling and holding unit 16 is connected to the column data line D and the row selection line W. The output of the sub-sampling and holding unit 16 is connected to the transferring switch unit 18.

The transferring switch unit 18 includes a transistor, the output of the sub-sampling and holding unit 16 is connected to the source side of the transferring switch unit 18, and the drain side of the transferring switch unit 18 is connected to the main sampling and holding unit 19. The gate side of the transferring switch unit 18 is connected to a transferring line T, and when the transferring line T becomes high, information held in the sub-sampling and holding unit 16 is transferred to the main sampling and holding unit 19. The output of the main sampling and holding unit 19 is connected to the voltage selection circuit 17. The voltage selection circuit 17 is connected to the blanking voltage line V0 and the driving voltage line V1. The voltage selection circuit 17 is connected to the pixel electrode 8 to provide a predetermined voltage to the pixel electrode 8. From binary information held in the main sampling and holding unit, for example, when the information held in the main sampling and holding unit is "0", the blanking voltage line V0 is selected, while when it is "1", the driving voltage line V1 is selected and connected to the pixel electrode. The value of the voltage of the counter electrode 10 is referred to as the common voltage Vcom.

Figure 27:
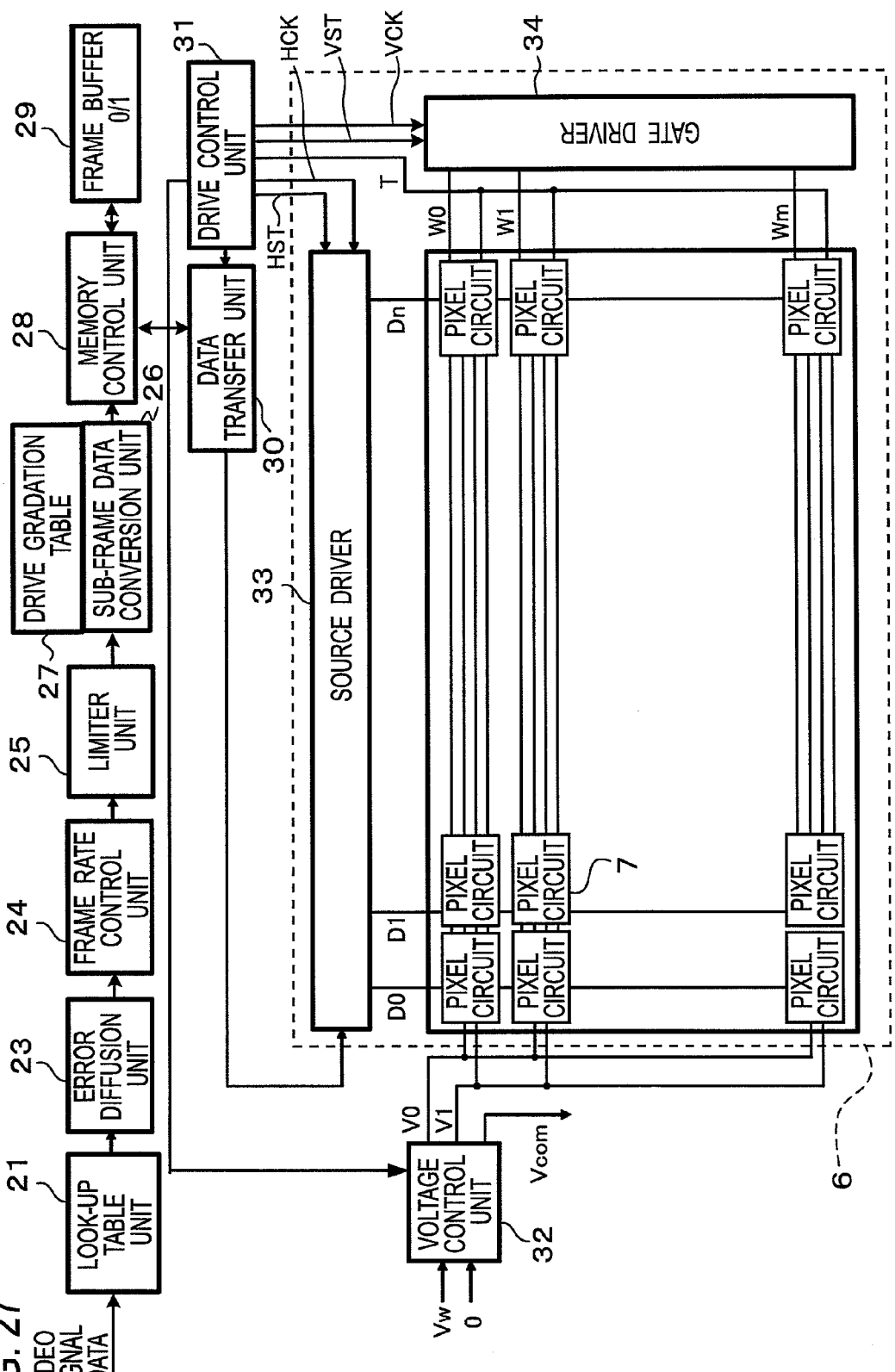
FIG. 27 is a block diagram showing a driving circuit (driving device) according to the fifth embodiment.

FIG. 27 is a block diagram showing a driving circuit (driving device) according to the fifth embodiment. As compared with the configuration of the driving circuit described in FIG. 4, the driving circuit (driving device) according to the fifth embodiment has the same configuration except that the transferring line T is added.

Figure 28:
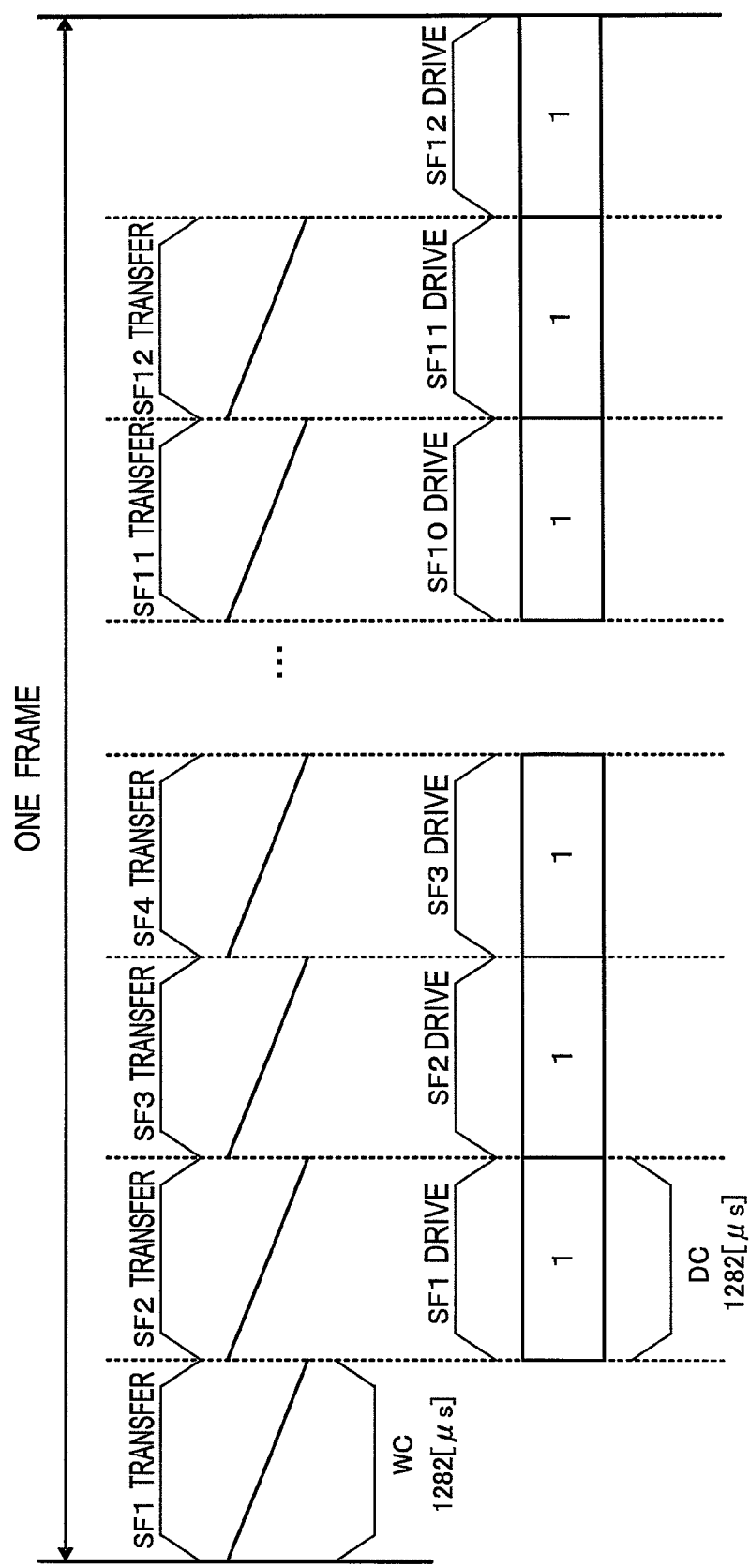
FIG. 28 is a view showing a driving pattern in the fifth embodiment.

By using FIG. 28, the driving pattern in the fifth embodiment will be described. FIG. 28 shows a case where the video signal includes 60 frames per second and the number of sub-frames is 12. WC represents the data transfer period (WC period) in which the data for each sub-frame is transferred to all the pixels in a liquid crystal display element. DC represents the driving period (DC period) in driving a liquid crystal. The WC period is set to 1282 [µs] and the DC period is set to 1282 [µs]. In one frame, data transfer (in the WC period) of SF1 is performed first, and the resulting data is held in the sub-sampling and holding unit within the pixel circuit. After the data transfer to all the pixels is completed, the transferring signal T becomes high, and the data held in the sub-sampling and holding unit of all the pixels are transferred to the main sampling and holding unit. Subsequently, the data transfer (in the WC period) of SF2 is performed, and at the same time the driving (DC period) of SF1 is performed during the same period as the WC period.

In this manner, the WC period and the DC period shift in parallel by the WC period (DC period), which continues 12 times. The data of 0 or 1 assigned to the respective sub-frames in order of SF1, SF2, . . . , SF11, and SF12 temporally from the head of the sub-frames are transferred in the WC period, and the liquid crystal of all the pixels is driven in the DC period. When the data sampled and held in a pixel is 0, this pixel reaches a blanking state, while when the data is 1, the pixel reaches a drive state.

Figure 29:
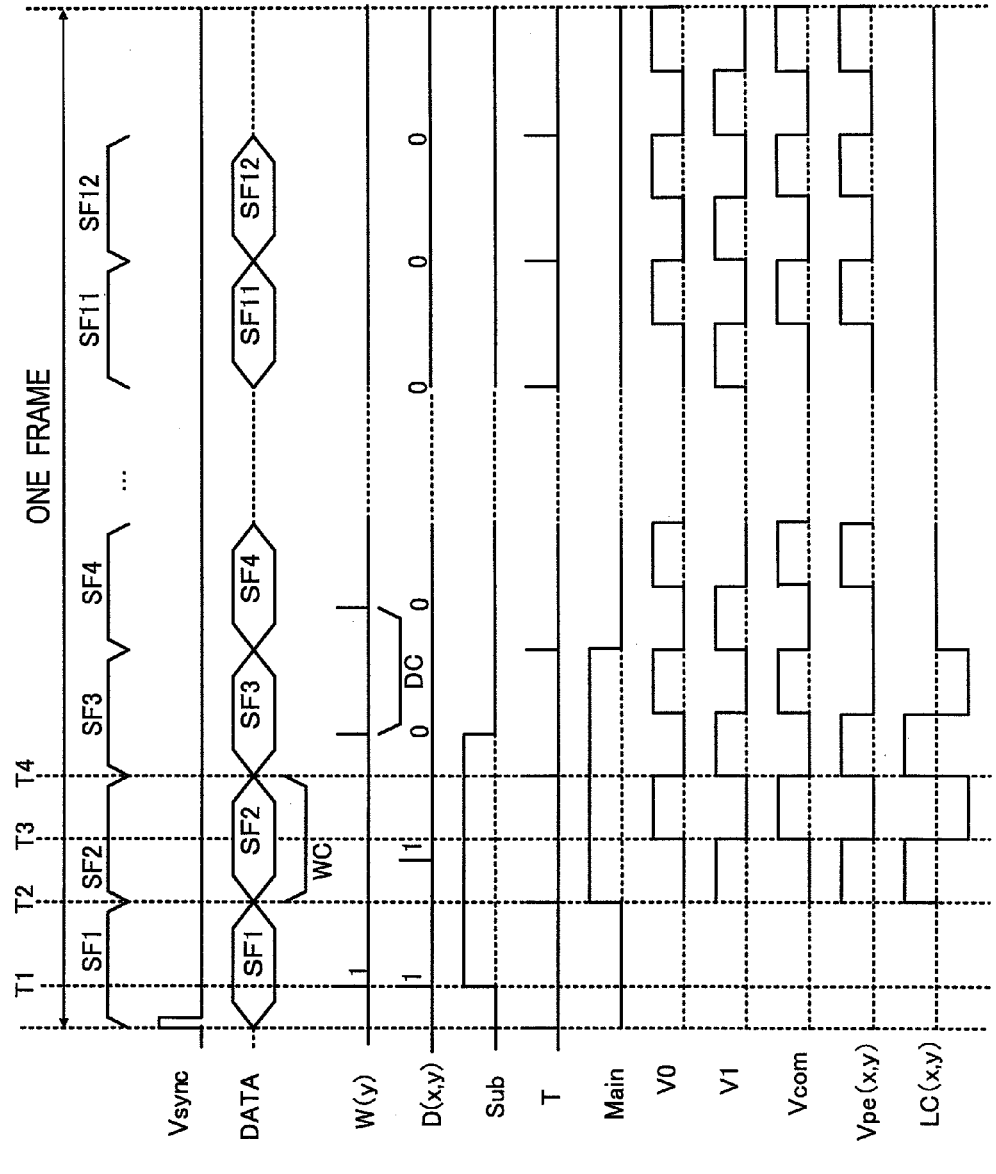
FIG. 29 is a view showing signal processing in the fifth embodiment.

FIG. 29 is a view showing the signal processing in the fifth embodiment. In the reflection type liquid crystal display element 6, the polarity inversion driving shown in FIG. 15 is performed as with the first embodiment.

Hereinafter, with reference to FIG. 26, FIG. 27, and FIG. 28, the signal processing is described in FIG. 29. In FIG. 29, the vertical synchronization signal Vsync becomes active at the time instant T0, and first the data of the sub-frame 1 (SF1) is transferred to the reflection type liquid crystal display element 6 in the period (T0 to T2). This period (T0 to T2) serves as the transfer period WC. At the time instant T1, data is transferred to a certain pixel (x, y), and is held in the sub-sampling and holding unit. At the time instant T2, the transferring signal T becomes high, and in all the pixels, the data held in the sub-sampling and holding unit is transferred to the main sampling and holding unit. In a period (T2 to T4), the data of the next sub-frame 2 (SF2) is transferred. At the same time, the control is performed by the voltage control unit 32 so that the period (T2 to T4) becomes the driving period DC of the sub-frame 1 (SF1), the DC balance+ driving is performed in the period (T2 to T3) and the DC balance driving− is performed in the period (T3 to T4), and V0/Vcom are set to GND and V1 is set to Vw in the period (T2 to T3), and furthermore so that V1 is set to GND and V0/Vcom are set to Vw in the period (T3 to T4).

As a result of the above-mentioned control, there is no need to set the data transfer period to the blanking period, and thus a high-luminance liquid crystal display apparatus can be provided.

Meanwhile, it goes without saying that in the fifth embodiment, the setting of the drive gradation is not limited to the setting of the first embodiment, and the settings as in the second and third embodiments are possible. Furthermore, the fifth embodiment includes a signal conversion unit instead of the look-up table unit, as with the fourth embodiment, and can also accommodate the configuration of performing the inverse gamma correction by varying the time length of the driving period of each sub-field. In this case, the ratio of the lengths of the driving period of the respective sub-fields shown in the fourth embodiment is not varied, but the driving period of each sub-field is set long at a constant rate, for example, twice, and thus a further increase in luminance can be achieved while the effect of inverse gamma correction is maintained. Therefore, according to the present embodiment, a much higher-luminance liquid crystal display apparatus having the effect of any of the first to fourth embodiments can be provided.

Sixth Embodiment

Figure 30:
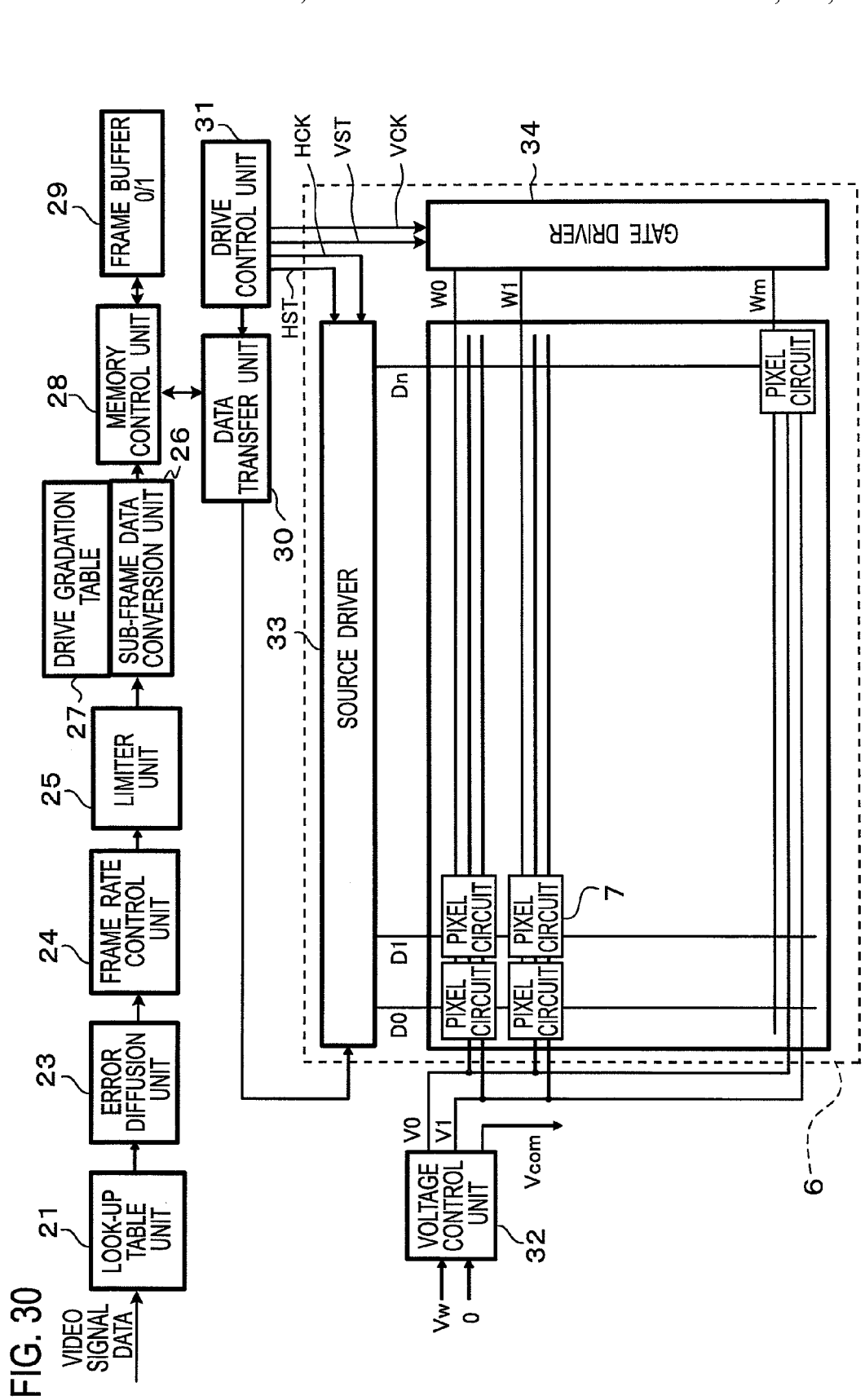
FIG. 30 is a block diagram showing a driving circuit (driving device) according to a sixth embodiment.

FIG. 30 is a block diagram showing a driving circuit (driving device) according to a sixth embodiment. The present embodiment differs from the configuration of the driving circuit of the first embodiment described in FIG. 4 only in that the control line from the drive control unit 31 to the voltage control unit 32 is eliminated. Here, the operation up to the data transfer unit 30 is the same as that of the first embodiment.

The drive control unit 31 controls the timing and the like of the processing for each sub-frame, issues a transfer instruction to the data transfer unit 30, and controls a gate driver 34. The data transfer unit 30, in accordance with an instruction from the drive control unit 31, instructs the memory control unit 28 and receives the data of a specified sub-frame from the memory control unit 28, and transfers the same to a source driver 33. The data transfer unit 30 transfers sub-frame data at certain intervals.

The source driver 33, every time receiving one line of data from the data transfer unit 30, simultaneously transfers the same to the corresponding pixel circuit 7 of the reflection type liquid crystal display element 6 by using column data lines D0 to Dn. At this time, in the gate driver 34, the row selection line Wy of a row specified by the vertical start signal (VST)/vertical shift clock signal (VCK) from the drive control unit 31 is activated, and thus data is transferred to the pixels of all the columns of the specified row y.

The voltage control unit 32 performs the polarity inversion processing of V0/V1/Vcom that are the voltages applied to a liquid crystal. V0 is a blanking voltage, V1 is a driving voltage, and Vcom (common voltage) is a voltage of the counter electrode 10 of a liquid crystal. The polarity inversion processing refers to the processing of setting the voltage value of each of V0/V1/Vcom to GND and Vw, alternately, at equal intervals. V0 and Vcom are applied with the same phase and V1 is applied with a phase shifted from V0/Vcom by a half cycle. Furthermore, the cycle of this polarity inversion is independent of the processing in the data transfer unit 30, and the polarity inversion processing is asynchronously performed.

Figure 31:
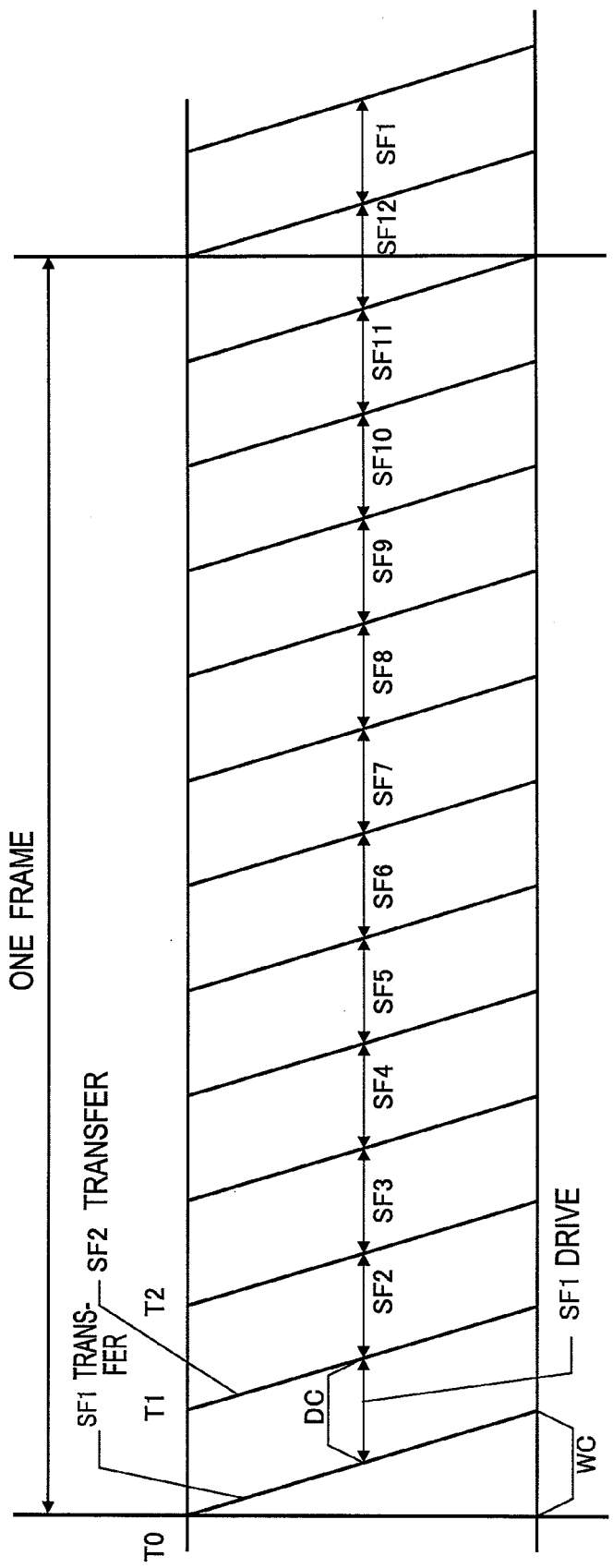
FIG. 31 is a view showing a driving pattern in the sixth embodiment.

The driving pattern in the sixth embodiment is described using FIG. 31. FIG. 31 shows a case where the video signal includes 60 frames per second and the number of sub-frames is 12. The WC period represents the data transfer period (WC period) in which the data for each sub-frame is transferred to all the pixels in a liquid crystal display element. The data of the sub-frame 1 is transferred during the WC period from T0, which is the head of the frame period, to T1. When the transfer of all the data of the sub-frame 1 is completed at T1, the data of the sub-frame 2 is transferred during the WC period from T1 to T2. In this manner, the upper horizontal line starting from T0 of FIG. 31 corresponds to the TOP (row 0) of a display area, and the lower horizontal line of FIG. 31 corresponds to the bottom (row m) of the display area.

In this way, in order to successively transfer the data for every 12 sub-frames to a liquid crystal display element, all the sub-frame periods of each pixel are the same as the WC period that is the data transfer period. In one frame period, the WC period and the DC period alternately continue 12 times. The data of 0 or 1 for each sub-frame assigned in order of SF1, SF2, . . . , SF11, and SF12 from the head, respectively, is transferred during the WC period, and when the data sampled and held in a pixel is 0, this pixel reaches a blanking state, while when it is 1, the pixel reaches a drive state.

Next, the drive gradation table in the sixth embodiment shown in FIG. 32 will be described. As with FIG. 31, the video signal includes 60 frames per second and the number of sub-frames is 12, the data transfer period (WC period) is set to 1388 [µs] and the driving period (DC period) to 1388 [µs]. FIG. 32 shows a state in the DC period for each sub-frame with respect to the drive gradations. The gradation in the vertical column of FIG. 32 is the 4-bit data obtained by the frame rate control unit 24, and is limited, by the limiter unit 25, to 12 that is the maximum value of the drive gradation. SF 1 to SF 12 represent the order of sub-frames in one frame. "1" in the column of the DC period indicates a drive state. "0" in the column of the DC period indicates the blank state.

When the gradation shown in the vertical column of FIG. 32 is 1, only SF1 that is the first sub-field reaches a drive state. When the gradation is 2, only SF1 and SF2 reach a drive state. Hereinafter, every time the gradation number increases and goes higher, the number of sub-frames to be in a drive state is increased, and in the case of 12, which is the highest gradation, all the sub-frames reach a drive state. In other words, as the gradation number increases, the number of sub-frames to be in a drive state is increased temporally backward.

Figure 33:
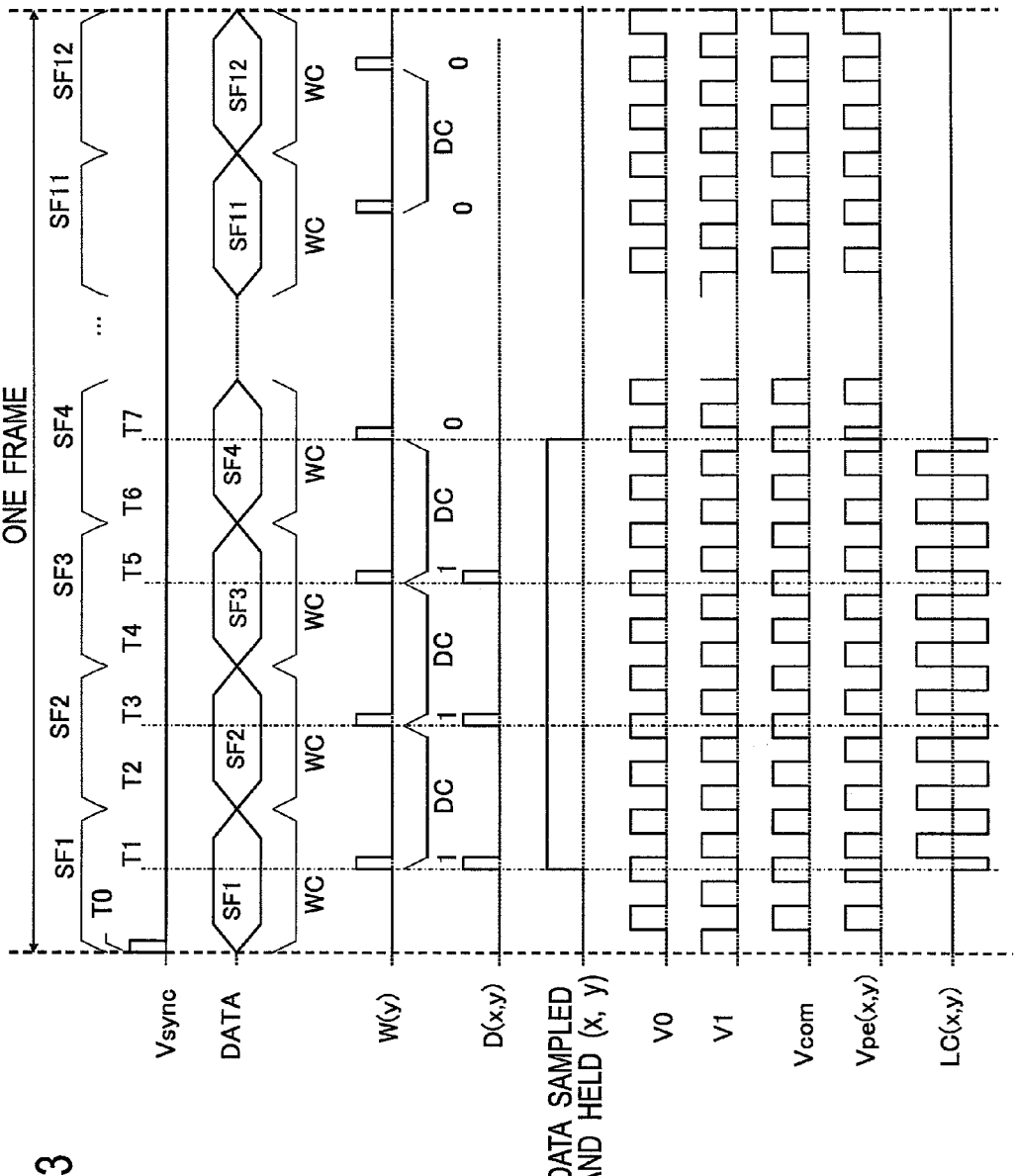
FIG. 33 is a view showing signal processing in the sixth embodiment.
Figure 34:
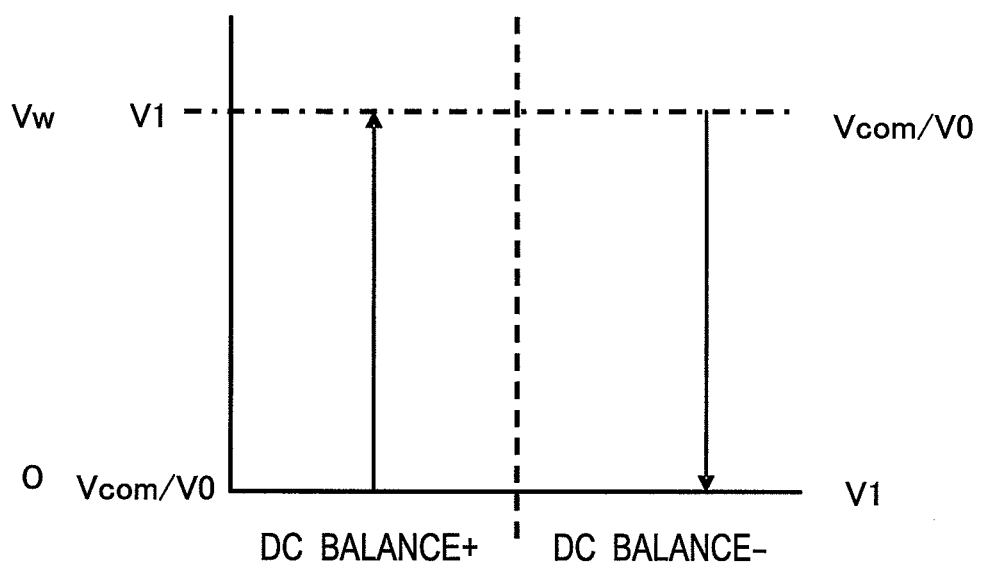
FIG. 34 is a view showing the polarity inversion driving of a reflection type liquid crystal display element in the sixth embodiment.

FIG. 33 is a view showing signal processing in the sixth embodiment. FIG. 34 is a view showing the polarity inversion driving of the reflection type liquid crystal display element 6 in the sixth embodiment.

The signal processing in the sixth embodiment is described using FIG. 33. FIG. 33 shows the signal processing in the sixth embodiment. The vertical synchronization signal Vsync becomes active at the time instant T0, and then a frame period begins and the data of the sub-frame 1 is transferred in the WC period (T0 to T2). At T1, a row selection line W(y) of a certain y row is selected, and then data D(x, y) "1" of a certain x column is applied to a column data line. As a result, a value (sampled and held data (x, y)) of the sampling and holding unit in a pixel of a certain x column y row becomes "1". When the value of the sampling and holding unit is "1", the value of the driving voltage line V1 is applied to a pixel electrode. When the driving voltage line V1 is selected, an electric field of the driving voltage Vw is applied to a liquid crystal and the liquid crystal is displayed as white. At T7, because the value of the sampling and holding unit becomes "0", the value of the voltage line V0 is applied to the pixel electrode. When the voltage line V0 is selected, the liquid crystal reaches a blanking state, in which the blanking voltage, i.e., an electric field, is not being applied, and is displayed as black.

In FIG. 33, V0 is a blanking voltage, V1 is a driving voltage, and Vcom (common voltage) is a voltage of the counter electrode 10 of a liquid crystal. The polarity inversion driving of V0/V1/Vcom is performed asynchronously with the above-described signal processing. The voltage values of V0/V1/Vcom are alternately set to GND and Vw at equal intervals. In the polarity inversion driving, the GND period and the Vw period have the same value, V0/Vcom perform the same action and V1 performs the action opposite to V0/Vcom. That is, control is performed so that when V0/Vcom are GND, V1 becomes Vw while when V0/Vcom are Vw, V1 becomes GND. Moreover, the cycle of the polarity inversion needs to be 1/(integer) of the data transfer period (WC period). In this way, the accumulative voltage of all the pixels become 0 [v], thus preventing burning. That is, by applying voltages (+Vw/−Vw) with the same voltage value but different polarities to a liquid crystal for the same period, and by averaging these voltages for a long time, the voltage LC applied to the liquid crystal is set to +Vw+(−Vw)=0 [v], thereby preventing burning. In FIG. 34, a state where V1 becomes Vw and V0/Vcom become GND is denoted by DC balance+. Moreover, such a state where V1 becomes GND and V0/Vcom become Vw is denoted by DC balance−.

As described above, in accordance with an instruction from the drive control unit 31, the data transfer unit 30, as shown in FIG. 30, from the row 0, which is the first row of the reflection type liquid crystal display element 6 having a plurality of pixels arranged in a plurality of rows and columns, up to the row m that is the last row thereof, transfers the sub-frame data of a predetermined number in order of row in a certain data transfer period (WC period), and subsequently transfers the sub-frame data of the next number of the sub-frame in order of row. In contrast, the voltage control unit 32 repeats the polarity inversion operation asynchronously with the start time of the data transfer period (WC period). That is, the start time of the data transfer period (WC period), as shown in FIG. 31, sequentially takes different values from the row 0 that is the first row of the reflection type liquid crystal display element 6 to the row m that is the last row thereof. However, the voltage control unit 32, apart from the above-described signal processing as shown in FIG. 31, performs the polarity inversion processing of V0/V1/Vcom at the same time instant regardless of the row of a pixel. Then, the voltage control unit 32 is characterized in that the period for transferring sub-frame data is an integral multiple of the cycle of polarity inversion. As apparent in FIG. 33, in the present embodiment, the period for transferring sub-frame data is three times the cycle of polarity inversion.

According to the present embodiment, a liquid crystal display apparatus can be provided which has the effect of the first embodiment, and which further does not need to set the data transfer period to a blanking state, without increasing the number of sampling and holding units in each pixel of the liquid crystal display element. Because only one sampling and holding unit in a pixel is required, high luminance can be realized, and because the pixel is small, miniaturization of the liquid crystal display element can be achieved. Due to miniaturization of the pixel, a large number of pixel circuits can be formed with elements of the same size, and even when the same optical system is used, much higher resolution can be achieved, which is also very cost-effective. Moreover, because a display element can be miniaturized, a smaller display apparatus can be provided with the same resolution.

In the first to sixth embodiments, a case has been described where when the number of bits of input video signal data is denoted by N, the number of bits when the drivable gradation number of a display element is expressed in binary is denoted by M, the number of bits that are diffused as an error by error diffusion processing is denoted by D, and the number of bits expressed as a pseudo gradation by frame rate control is denoted by F, then N=8, M=4, D=4, and F=2. However, the values of N, M, D, and F are not limited to the above-mentioned values, and the present invention can be carried out using various values. Above all, N=8 to 12, M=4 to 6, D=4 to 8, and F=2 to 3 are more preferable.

It will be evident from explanations of the foregoing that the present invention can provide a liquid crystal display apparatus that generates very few moving image pseudo-contours responsible for image degradation and has high quality even at the time of displaying a moving image.

What is claimed is:

1. A driving device of a liquid crystal display element comprising:
   a look-up table unit configured to convert input video signal data of N bits to (M+F+D) bit data, when N, M, F, and D are integers, by performing inverse gamma correction using a predetermined look-up table which holds a set of N bit data selected from a set of (M+F+D) bit data corresponding to luminance data generated by linear interpolation of measured luminance of the liquid crystal display element, and the set of N bit data serves so as to remove gamma correction from the input video signal data of N bits, where (M+F+D) is larger than N;
   an error diffusion unit configured to convert the (M+F+D) bit data processed by the look-up table unit, into (M+F) bit data by error diffusion processing;
   a frame rate control unit configured to derive a value of 0/1 from a frame rate control table for frame rate control based on lower F bit data of (M+F) bit data processed by the error diffusion unit, and configured to convert the (M+F) bit data processed by the error diffusion unit, into M bit data by adding the derived value of 0/1 to upper M bit data of (M+F) bit data; and
   a sub-frame data conversion unit configured to generate sub-frame data by using the M bit data processed by the frame rate control unit, configuring all sub-frames by a step-bit pulse respectively, and using a drive gradation table where when a drive gradation is 1, an arbitrary sub-frame reaches a drive state, and every time the drive gradation increases by one, a sub-frame adjacent to a sub-frame already in a drive state is set from a blanking state into a drive state.

2. The driving device of a liquid crystal display element according to claim 1, wherein a sub-frame to be in a drive state when the drive gradation is 1, is a first sub-frame.

3. The driving device of a liquid crystal display element according to claim 1, wherein a sub-frame to be in a drive state when the drive gradation is 1, is a last sub-frame.

4. A liquid crystal display apparatus, comprising:
the driving device of a liquid crystal display element according to claim 1;
a liquid crystal display element configured to be driven by the driving device;
an illumination optical system configured to cause illumination light to be incident upon the liquid crystal display element; and
a projection lens configured to project modulated light emitted from the liquid crystal display element.

5. A liquid crystal display apparatus, comprising:
the driving device of a liquid crystal display element according to claim 1;
a liquid crystal display element configured to be driven by the driving device;
an illumination optical system configured to cause illumination light to be incident upon the liquid crystal display element; and
a projection lens configured to project modulated light emitted from the liquid crystal display element, wherein
the liquid crystal display element individually includes a first sampling and holding unit and a second sampling and holding unit, wherein
the first sampling and holding unit, during a data transfer period with respect to a predetermined sub-frame, receives and holds data with respect to the predetermined sub-frame, and transfers the data with respect to the predetermined sub-frame to the second sampling and holding unit after an end of the data transfer period with respect to the predetermined sub-frame, and wherein
the liquid crystal display element, during a data transfer period with respect to the next sub-frame of the predetermined sub-frame, performs a driving for the predetermined sub-frame based on data which the second sampling and holding unit holds.

6. A driving device of a liquid crystal display element comprising:
a signal conversion unit configured to convert input video signal data of N bits into (M+F+D) bit data when N, M, F, and D are integers, by using a predetermined look-up table which holds a set of N bit data selected from a set of (M+F+D) bit data corresponding to luminance data generated by linear interpolation of measured luminance of the liquid crystal display element, where (M+F+D) is larger than N;
an error diffusion unit configured to convert the (M+F+D) bit data processed by the signal conversion unit, into (M+F) bit data by error diffusion processing;
a frame rate control unit configured to derive a value of 0/1 from a frame rate control table for frame rate control based on lower F bit data of (M+F) bit data processed by the error diffusion unit, and configured to convert the (M+F) bit data processed by the error diffusion unit, into M bit data by adding the derived value of 0/1 to upper M bit data of (M+F) bit data; and
a sub-frame data conversion unit configured to generate sub-frame data by using the M bit data processed by the error diffusion unit and using a drive gradation table where when a drive gradation is 1, an arbitrary sub-frame reaches a drive state, and every time the drive gradation increases by one, a sub-frame adjacent to a sub-frame already in a drive state is set from a blanking state into a drive state, and where a driving period is varied for each sub-frame so that an optical output of a liquid crystal with respect to the input video signal data has an inverse gamma property.

7. The driving device of a liquid crystal display element according to claim 6, wherein a sub-frame to be in a drive state when the drive gradation is 1, is a first sub-frame.

8. The driving device of a liquid crystal display element according to claim 6, wherein a sub-frame to be in a drive state when the drive gradation is 1, is a last sub-frame.

9. A liquid crystal display apparatus, comprising:
the driving device of a liquid crystal display element according to claim 6;
a liquid crystal display element configured to be driven by the driving device;
an illumination optical system configured to cause illumination light to be incident upon the liquid crystal display element; and
a projection lens configured to project modulated light emitted from the liquid crystal display element.

10. A liquid crystal display apparatus, comprising:
the driving device of a liquid crystal display element according to claim 6;
a liquid crystal display element configured to be driven by the driving device;
an illumination optical system configured to cause illumination light to be incident upon the liquid crystal display element; and
a projection lens configured to project modulated light emitted from the liquid crystal display element, wherein
the liquid crystal display element individually includes a first sampling and holding unit and a second sampling and holding unit, wherein
the first sampling and holding unit, during a data transfer period with respect to a predetermined sub-frame, receives and holds data with respect to the predetermined sub-frame, and transfers the data with respect to the predetermined sub-frame to the second sampling and holding unit after an end of the data transfer period with respect to the predetermined sub-frame, and wherein
the liquid crystal display element, during a data transfer period with respect to the next sub-frame of the predetermined sub-frame, performs a driving for the predetermined sub-frame based on data which the second sampling and holding unit holds.

11. A driving method of a liquid crystal display element comprising:
a first step of converting input video signal data of N bits into (M+F+D) bit data, when N, M, F, and D are integers, by performing inverse gamma correction using a predetermined look-up table which holds a set of N bit data selected from a set of (M+F+D) bit data corresponding to luminance data generated by linear interpolation of measured luminance of the liquid crystal display element, and the set of N bit data serves so as to remove gamma correction from the input video signal data of N bits, where (M+F+D) is larger than N;
a second step of converting the (M+F+D) bit data processed in the first step, into (M+F) bit data by error diffusion processing;
a third step of deriving a value of 0/1 from a frame rate control table for frame rate control based on lower F bit data of (M+F) bit data processed in the second step, and converting the (M+F) bit data processed in the second step, into M bit data by adding the derived value of 0/1 to upper M bit data of (M+F) bit data; and a fourth step of generating sub-frame data by using the M bit data processed in the third step, configuring all sub-frames by a step-bit pulse respectively, and using a drive gradation table where when a drive gradation is 1, an arbitrary sub-frame reaches a drive state, and every time the drive gradation increases by one, a sub-frame adjacent to a sub-frame already in a drive state is set from a blanking state into a drive state.

12. The driving method of a liquid crystal display element according to claim 11, wherein a sub-frame to be in a drive state when the drive gradation is 1, is a first sub-frame.

13. The driving method of a liquid crystal display element according to claim 11, wherein a sub-frame to be in a drive state when the drive gradation is 1, is a last sub-frame.

14. A driving method of a liquid crystal display element comprising:
- a first step of converting input video signal data of N bits into (M+F+D) bit data when N, M, F, and D are integers, by using a predetermined look-up table which holds a set of N bit data selected from a set of (M+F+D) bit data corresponding to luminance data generated by linear interpolation of measured luminance of the liquid crystal display element, where (M+F+D) is larger than N;
- a second step of converting the (M+F+D) bit data processed in the first step, into (M+F) bit data by error diffusion processing;
- a third step of deriving a value of 0/1 from a frame rate control table for frame rate control based on lower F bit data of (M+F) bit data processed in the second step, and converting the (M+F) bit data processed in the second step, into M bit data by adding the derived value of 0/1 to upper M bit data of (M+F) bit data; and
- a fourth step of generating sub-frame data by using the M bit data processed in the third step and using a drive gradation table where when a drive gradation is 1, an arbitrary sub-frame reaches a drive state, and every time the drive gradation increases by one, a sub-frame adjacent to a sub-frame already in a drive state is set from a blanking state into a drive state, and where a driving period is varied for each sub-frame so that an optical output of a liquid crystal with respect to the input video signal data has an inverse gamma property.

15. The driving method of a liquid crystal display element according to claim 14, wherein a sub-frame to be in a drive state when the drive gradation is 1, is a first sub-frame.

16. The driving method of a liquid crystal display element according to claim 14, wherein a sub-frame to be in a drive state when the drive gradation is 1, is a last sub-frame.

17. A driving device of a liquid crystal display element comprising:
- a look-up table unit configured to convert input video signal data of N bits into data of (M+F+D) bits, when N, M, F, and D are integers, by performing inverse gamma correction using a predetermined look-up table which holds a set of N bit data selected from a set of (M+F+D) bit data corresponding to luminance data generated by linear interpolation of measured luminance of the liquid crystal display element, and the set of N bit data serves so as to remove gamma correction from the input video signal data of N bits, where (M+F+D) is larger than N;
- an error diffusion unit configured to convert the (M+F+D) bit data processed by the look-up table unit, into (M+F) bit data by error diffusion processing;
- a frame rate control unit configured to derive a value of 0/1 from a frame rate control table for frame rate control based on lower F bit data of (M+F) bit data processed by the error diffusion unit, and configured to convert the (M+F) bit data processed by the error diffusion unit, into M bit data adding the derived value of 0/1 to upper M bit data of (M+F) bit data;
- a sub-frame data generation unit configured to generate sub-frame data by using the M bit data processed by the frame rate control unit, configuring all sub-frames by a step-bit pulse respectively, and using a drive gradation table where when a drive gradation is 1, a first sub-frame reaches a drive state, and every time a drive gradation number increases by one, a sub-frame adjacent to a sub-frame already in a drive state is set from a blanking state into a drive state;
- a data transfer unit configured to transfer, in a certain data transfer period, sub-frame data of a predetermined number in order of row to a liquid crystal display element having a plurality of pixels arranged in a plurality of rows and columns, and subsequently transferring sub-frame data of a number next to the number in order of row;
- a pixel circuit unit having: a sampling and holding unit configured to hold the sub-frame data of input 0 or 1; and a voltage selection unit configured to select, in accordance with the sub-frame data of the 0 or 1 held in the sampling and holding unit, either a blanking voltage or a driving voltage and supplying the same to a pixel electrode of the liquid crystal display element; and
- a voltage control unit configured to repeat polarity inversion of a pixel of the liquid crystal display element asynchronously with a start time of the data transfer period of the data transfer unit.

18. The driving device of a liquid crystal display element according to claim 17, wherein in a liquid crystal display apparatus, a period for transferring the sub-frame data is an integral multiple of a cycle of the polarity inversion.

19. A liquid crystal display apparatus, comprising:
the driving device of a liquid crystal display element according to claim 17;
a liquid crystal display element configured to be driven by the driving device;
an illumination optical system configured to cause illumination light to be incident upon the liquid crystal display element; and
a projection lens configured to project modulated light emitted from the liquid crystal display element.

20. A driving method of a liquid crystal display element comprising the steps of:
converting input video signal data of N bits into data of (M+F+D) bits, when N, M, F, and D are integers, by performing inverse gamma correction using a predetermined look-up table which holds a set of N bit data selected from a set of (M+F+D) bit data corresponding to luminance data generated by linear interpolation of measured luminance of the liquid crystal display element, and the set of N bit data serves so as to remove gamma correction from the input video signal data of N bits, where (M+F+D) is larger than N;
converting the (M+F+D) bit data into (M+F) bit data by error diffusion processing;
deriving a value of 0/1 from a frame rate control table for frame rate control based on lower F bit data of (M+F) bit data processed in the second step;

converting the (M+F) bit data into M bit data by adding the derived value of 0/1 to upper M bit data of (M+F) bit data;

generating sub-frame data by using the data of M bits, configuring all sub-frames by a step-bit pulse respectively, and using a drive gradation table where when a drive gradation is 1, a first sub-frame reaches a drive state, and every time a drive gradation increases by one, a sub-frame adjacent to a sub-frame already in a drive state is set from a blanking state into a drive state;

transferring, in a certain data transfer period, sub-frame data of a predetermined number in order of row to a liquid crystal display element having a plurality of pixels arranged in a plurality of rows and columns, and subsequently transferring sub-frame data of a number next to the number in order of row;

holding the sub-frame data of 0 or 1 of input;

selecting either one of a blanking voltage or a driving voltage and supplying the same to a pixel electrode of the liquid crystal display element, in accordance with the sub-frame data of 0 or 1 of hold; and repeating polarity inversion of a pixel of the liquid crystal display element asynchronously with a start time of the data transfer period.

21. The driving method of a liquid crystal display element according to claim 20, wherein the period for transferring sub-frame data is an integral multiple of a cycle of polarity inversion.

* * * * *